(12) United States Patent
Chartoff et al.

(10) Patent No.: US 9,513,406 B2
(45) Date of Patent: Dec. 6, 2016

(54) SOLUBLE FUNCTIONALIZED NANOPARTICLES FOR USE IN OPTICAL MATERIALS

(71) Applicant: State of Oregon acting by and through the State Board of Higher Education on behalf of University of Oregon, Eugene, OR (US)

(72) Inventors: Richard Chartoff, Eugene, OR (US); Casey Check, Eugene, OR (US)

(73) Assignee: University of Oregon, Eugene, OR (US)

(*) Notice: Subject to any disclaimer, the term of this patent is extended or adjusted under 35 U.S.C. 154(b) by 514 days.

(21) Appl. No.: 13/944,797

(22) Filed: Jul. 17, 2013

(65) Prior Publication Data

US 2015/0021528 A1    Jan. 22, 2015

(51) Int. Cl.
| | | |
|---|---|---|
| *F21V 9/00* | (2015.01) | |
| *C07F 3/00* | (2006.01) | |
| *G02B 1/04* | (2006.01) | |
| *C08F 220/18* | (2006.01) | |
| *C08F 222/10* | (2006.01) | |
| *C08K 9/04* | (2006.01) | |
| *B82Y 20/00* | (2011.01) | |
| *B82Y 30/00* | (2011.01) | |

(52) U.S. Cl.
CPC .............. *G02B 1/04* (2013.01); *C08F 220/18* (2013.01); *C08F 222/1006* (2013.01); *C08K 9/04* (2013.01); *B82Y 20/00* (2013.01); *B82Y 30/00* (2013.01)

(58) Field of Classification Search
USPC ...... 252/582; 556/136, 118, 10, 55, 31, 130; 423/478, 598, 622, 263; 514/772.4
See application file for complete search history.

(56) References Cited

U.S. PATENT DOCUMENTS

| | | |
|---|---|---|
| 6,423,260 B1 | 7/2002 | Chartoff et al. |
| 6,805,902 B1 | 10/2004 | Hayes |
| 6,836,371 B2 | 12/2004 | Lai et al. |
| 6,934,088 B2 | 8/2005 | Lai et al. |
| 6,976,641 B2 | 12/2005 | Lai et al. |
| 7,046,439 B2 | 5/2006 | Kaminsky et al. |
| 7,420,743 B2 | 9/2008 | Lai et al. |
| 7,806,499 B2 | 10/2010 | Nagayama |
| 8,592,511 B2 | 11/2013 | Gonen Williams et al. |
| 2004/0008319 A1 | 1/2004 | Lai et al. |
| 2004/0233526 A1 | 11/2004 | Kaminsky et al. |
| 2005/0057815 A1 | 3/2005 | Lai et al. |
| 2006/0088713 A1 | 4/2006 | Dykstra et al. |
| 2010/0181901 A1 | 7/2010 | Douglas et al. |
| 2011/0227008 A1 | 9/2011 | Jones et al. |
| 2012/0088845 A1* | 4/2012 | Gonen Williams .... B82Y 30/00 514/772.4 |
| 2013/0221279 A1 | 8/2013 | Xu et al. |
| 2014/0045323 A1 | 2/2014 | Gonen Williams et al. |

FOREIGN PATENT DOCUMENTS

| | | |
|---|---|---|
| WO | WO 2004/008189 A1 | 1/2004 |
| WO | WO 2004/106988 A2 | 12/2004 |
| WO | WO 2008/157604 A1 | 12/2008 |
| WO | WO 2011/133228 | 10/2011 |
| WO | WO 2012/058271 | 5/2012 |

OTHER PUBLICATIONS

Chartoff et al., "Functionally graded polymer matrix nano-composites by solid freeform fabrication: a preliminary report," *Solid Freeform Fabrication Symposium Proceedings*, pp. 385-391, 2003.
McMorrow et al., "Processing and characterization of a carbon nanofiber/vinyl-ester resin composite," $48^{th}$ *International Symposium and Exhibition, Advancing Materials in the Global Economy—Applications, Emerging Markets and Evolving Technologies*, Book 2(48), pp. 2585-2598, 2003.
McMorrow et al., "Particle surface treatment for nanocomposites containing ceramic particles," *Composite Interfaces* 13(8-9):801-817, 2006.
Pilkenton et al., "Effect of oxygen on the crosslinking and mechanical properties of a thermoset formed by free-radical photocuring," *J. Appl. Polymer Sci.* 119:2359-2370, Sep. 1, 2010.

* cited by examiner

*Primary Examiner* — Monique Peets
(74) *Attorney, Agent, or Firm* — Klarquist Sparkman, LLP

(57) ABSTRACT

Disclosed embodiments concern a soluble functionalized nanoparticle suitable for use with polymerizable components, such as monomers (or polymers thereof), used to make gradient optical polymer nanocomposites. In particular disclosed embodiments, the nanoparticle is functionalized with one or more surface ligands that promote the solubility and dispersion of the nanoparticle in the disclosed monomer. Also disclosed herein are embodiments of a method for making the functionalized nanoparticle as well as embodiments of a composition comprising the functionalized nanoparticles.

15 Claims, 10 Drawing Sheets

SOLUBLE FUNCTIONALIZED NANOPARTICLES FOR USE IN OPTICAL MATERIALS

ACKNOWLEDGMENT OF GOVERNMENT SUPPORT

This invention was made with government support under contract FA8650-12-C-7226 awarded by the Air Force Research Laboratory. The government has certain rights in the invention.

CROSS REFERENCE TO RELATED APPLICATION

This application is related to the U.S. patent application Ser. No. entitled GRADIENT OPTICAL POLYMER NANOCOMPOSITES, filed concurrently, and which is incorporated herein by reference.

FIELD

The disclosure pertains to soluble functionalized nanoparticles for use in optical materials, and methods of making the same.

BACKGROUND

Intensive interest in forming polymer nano-composite optical materials with a high refractive index has developed in recent years as potential applications for such materials in lenses, filters, reflectors, optical waveguides, optical adhesives, and anti-reflection films, have emerged. Incorporating inorganic domains into a polymer matrix is an effective way to fabricate high refractive index composite materials. The refractive index of such composites varies linearly with the volume fraction of inorganic additive. However, typically the size of the inorganic domains must be below one tenth of the wavelength of visible light (400-800 nm) in order to avoid Rayleigh scattering and obtain transparent polymer composites. Controlling the size of inorganic domains by effective dispersion in the nanometer regime therefore is a consideration in developing these materials.

Lead sulfide (PbS) nanoparticles have a high refractive index and can be introduced into a polymer matrix to create high refractive index nanocomposites. For example, PbS nanoparticles have been introduced into poly(ethylene oxide) or gelatin to produce nanocomposites with high refractive indices. However, the polymer matrices used in these studies were water-soluble polymers and the particle-matrix interactions were weak. So the application of such composites is limited in many cases where materials with water insolubility, good thermal stability, and more robust mechanical properties are needed, in addition to optical clarity. Thus, there remains a need in the art to provide nanoparticle materials that are capable of being incorporated in water-insoluble polymer matrices.

SUMMARY

Disclosed herein is a composition, comprising a polymerizable component, such as a curable monomer and a nanoparticle functionalized with one or more surface ligands having a formula selected from

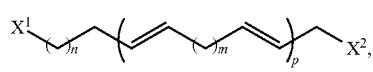

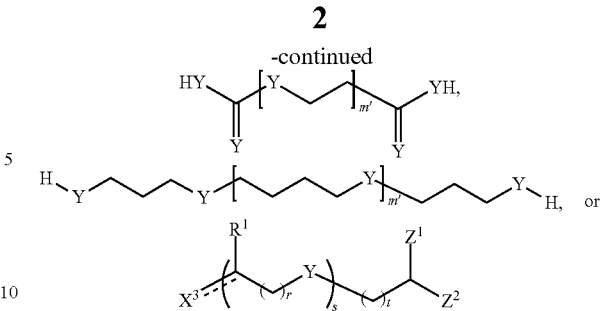

wherein each of $X^1$ and $X^2$ independently is selected from hydrogen, carboxyl, carbonylamino, carbonylthio, carbonylhydrazide, amino, hydroxyl, thiol, hydrazide, phosphonate, and phosphine;

$X^3$ independently is selected from amino, hydroxyl, thiol, oxygen, sulfur, and $NR^2$ wherein $R^2$ is selected from hydrogen, aliphatic (such as alkyl, substituted alkyl, alkenyl, substituted alkenyl, alkynyl, substituted alkynyl), aryl, substituted aryl, cycloaliphatic (such as cycloalkyl, substituted cycloalkyl, cycloalkenyl, substituted cycloalkenyl, cycloalkynyl, and substituted cycloalkynyl);

each Y independently is selected from oxygen, sulfur, and $NR^2$;

$Z^1$ is selected from carboxyl, carbonylamino, carbonylthio, carbonylhydrazide, amino, hydroxyl, thiol, hydrazide, phosphonate, and phosphine;

$Z^2$ is selected from hydrogen, hydroxyl, alkoxy, amino, thiol, and thioether;

$R^1$ is selected from hydrogen, aliphatic (such as alkyl, substituted alkyl, alkenyl, substituted alkenyl, alkynyl, substituted alkynyl), aryl, substituted aryl, cycloaliphatic (such as cycloalkyl, substituted cycloalkyl, cycloalkenyl, substituted cycloalkenyl, cycloalkynyl, and substituted cycloalkynyl);

n ranges from 0 to about 38;
m is 0, 1, 2, or 3;
p is 0, 1, 2, 3, or 4;
r is 0, 1, 2, or 3;
each of s and t independently ranges from 0 to 20
n' ranges from 1 to 20; and
each m' independently is selected from 1 to about 20.

The nanoparticle may be selected from a variety of nanoparticle materials. In particular disclosed embodiments, the nanoparticle is selected from $BaTiO_3$, SiC, CdTe, Si, ZnTe, PbS, ZnS, Ge, $MoSi_2$, $MoS_2$, GaAs, InP, $Fe_2O_3$, $Fe_3O_4$, $ZrSiO_4$, $MgAl_2O_4$, $TiO_2$, $SiO_2$, ZnO, $LiF_3$, $LaBr_3$, $YVO_4$, $YVBO_4$, CdSe, PbSe, InSb, nanodiamond, and GaP. Exemplary nanoparticles and surface ligands may be selected from those disclosed herein or others that a person of ordinary skill in the art would recognize as being within the scope of the present disclosure.

The nanoparticle typically may have a diameter ranging from about 2 nm to about 50 nm. In other embodiments, the nanoparticle has a diameter ranging from about 2 nm to about 30 nm. In yet other embodiments, the nanoparticle has a diameter ranging from about 2 nm to about 15 nm, or from about 2 nm to about 10 nm. In exemplary embodiments, the nanoparticle has a diameter ranging from about 2 nm to about 5 nm. The nanoparticle may have a shape selected from spherical, ellipsoidal, cylindrical, or oblate. Exemplary nanoparticles include, but are not limited to PbS, ZnS, $MoS_2$, $TiO_2$, nanodiamond, and silicon.

In particular disclosed embodiments, the polymerizable component has a refractive index ranging from about 1.2 to about 1.8. Also, the polymerizable component has a viscosity of about 5 cP to about 20 cP, or about 10 cP to about 20 cP. In other disclosed embodiments, the polymerizable component has a viscosity of about 10 cP to about 15 cP.

Exemplary embodiments of the polymerizable component include, but are not limited to, hexanediol-diacrylate (HDDA), methyl acrylate, ethyl acrylate, butyl acrylate, isobutyl acrylate, tert-butyl acrylate, n-hexyl acrylate, ethylhexyl acrylate, n-octyl acrylate, isooctyl acrylate, n-decyl acrylate, n-dodecyl acrylate, n-hexadecyl acrylate, n-octadecyl acrylate, isobornyl acrylate, benzyl acrylate, phenyl acrylate, low molecular weight oligo-ethylene glycol monomethyl ether acrylate, ethylene glycol monomethyl ether acrylate, diethyleneglycol monomethyl ether acrylate, triethylene glycol monomethyl ether acrylate, tetraethylene glycol monomethyl ether acrylate, diethylene glycol diacrylate, triethylene glycol diacrylate, tetraethylene glycol diacrylate, low molecular weight oligio-ethylene glycol diacrylate, trimethylolpropane triacrylate, pentaerythritol tetraacrylate, neopentyl glycol diacrylate (2,2-dimethyl-1,3-propanediol diacrylate), 1,10-decanediol diacrylate, hexanediol-dimethacrylate, ethyl methacrylate, butyl methacrylate, isobutyl methacrylate, tert-butyl methacrylate, n-hexyl methacrylate, ethylhexyl methacrylate, n-octyl metacrylate, isooctyl methacrylate, n-decyl methacrylate, n-dodecyl methacrylate, n-hexadecyl methacrylate, n-octadecyl methacrylate, benzyl methacrylate, phenyl methacrylate, low molecular weight oligio-ethylene glycol monomethyl ether methacrylate, ethylene glycol monomethyl ether methacrylate, diethyleneglycol monomethyl ether methacrylate, triethylene glycol monomethyl ether methacrylate, tetraethylene glycol monomethyl ether methacrylate, diethylene glycol dimethacrylate, triethylene glycol dimethacrylate, tetraethylene glycol dimethacrylate, low molecular weight oligio-ethylene glycol dimethacrylate, trimethylolpropane trimethacrylate, pentaerythritol tetramethacrylate, neopentyl glycol dimethacrylate (2,2-dimethyl-1,3-propanediol dimethacrylate), 1,10-decanediol dimethacrylate, and combinations thereof.

The composition typically comprises from about 1% wt/v to about 80% wt/v of the nanoparticle. Particular disclosed embodiments of the composition comprise from about 10% wt/v to about 50% wt/v of the nanoparticle. Other disclosed embodiments comprise from about 10% wt/v to about 40% wt/v of the nanoparticle.

Other disclosed embodiments concern a method of making the nanoparticle. The method typically comprises modifying a nanoparticle with one or more surface ligands, functionalizing the nanoparticle, and isolating the nanoparticle. In particular disclosed embodiments, the nanoparticle is selected from $BaTiO_3$, SiC, CdTe, Si, ZnTe, PbS, ZnS, Ge, $MoSi_2$, $MoS_2$, GaAs, InP, $Fe_2O_3$, $Fe_3O_4$, $ZrSiO_4$, $MgAl_2O_4$, $SiO_2$, ZnO, $LiF_3$, $LaBr_3$, $YVO_4$, $TiO_2$, $YVBO_4$, CdSe, PbSe, InSb, nanodiamond, and GaP. The modifying step can comprise exposing a ligand-free nanoparticle to one or more surface ligands. The surface ligands may be in solution. In particular disclosed embodiments, the functionalizing step can comprise adding a ligand directly in the particle synthesis, performing a ligand exchange reaction, a functional group modification reaction, or combinations thereof. Performing a ligand exchange reaction typically comprises exposing a nanoparticle comprising one or more surface ligands to one or more surface exchange ligands. The surface exchange ligands can replace the surface ligands thereby providing a functionalized nanoparticle. In particular disclosed embodiments, the surface exchange ligand can be provided in a solution.

In other disclosed embodiments, the functionalizing step comprises performing a functional group modification reaction. Such embodiments concern exposing a nanoparticle comprising one or more surface ligands to a reagent that chemically binds to a terminal functional group of the one or more surface ligands. The reagent typically comprises a carbonyl moiety that becomes bound through a carbon atom of the carbonyl moiety to the terminal functional group of the one or more surface ligands.

In particular disclosed embodiments, the method concerns performing a ligand exchange reaction and the surface ligand has a formula

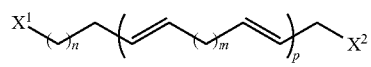

wherein each of $X^1$ and $X^2$ independently are selected from hydrogen, carboxyl, thiol, carbonylamino, carbonylthio, carbonylhydrazide; n ranges from 0 to about 38; m is 0, 1, 2, or 3; and p is 0, 1, 2, 3, or 4. Exemplary embodiments of this particular method concern using octadecanethiol, dodecanethiol, decanethiol, hexadecanethiol, myristoleic acid, palmitoleic acid, sapienic acid, oleic acid, elaidic acid, linoleic acid, arachidonic acid, lauric acid, myristic acid, palmitic acid, stearic acid, arachidic acid, and combinations thereof, as surface ligands.

In other disclosed embodiments, the method concerns performing a functional group modification reaction and the surface ligand has a formula

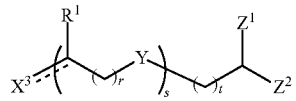

wherein
  $X^3$ independently is selected from amino, hydroxyl, thiol;
  each Y independently is selected from oxygen, sulfur, and $NR^2$;
  $Z^1$ is selected from amino, hydroxyl, thiol, hydrazide, phosphonate, and phosphine;
  $Z^2$ is selected from hydrogen, hydroxyl, alkoxy, amino, thiol, and thioether;
  $R^1$ is selected from hydrogen, aliphatic (such as alkyl, substituted alkyl, alkenyl, substituted alkenyl, alkynyl, substituted alkynyl), aryl, substituted aryl, cycloaliphatic (such as cycloalkyl, substituted cycloalkyl, cycloalkenyl, substituted cycloalkenyl, cycloalkynyl, and substituted cycloalkynyl);
  r is 0, 1, 2, or 3; and
  each of s and t independently ranges from 0 to 20.
Exemplary surface ligands according to this particular embodiment of the disclosed method include, but are not limited to, diethylene glycol monomethyl ether thiol, triethylene glycol monomethyl ether thiol, tetraethylene glycol monomethyl ether thiol, low molecular weight olio-ethylene glycol monomethyl ether thiol, and combinations thereof.

Particular disclosed embodiments concern a functionalized nanoparticle, comprising a PbS or ZnS core and one or more 6-acetoxyhexanoic acid ligands, acetoxy-functionalized mercaptoethanol ligands, or acetoxy-functionalized 6-mercapto-1-hexanol ligands coupled to the PbS or ZnS core.

Additional disclosed embodiments concern a composition comprising a curable monomer and a functionalized nanoparticle comprising a PbS or ZnS core and one or more 6-acetoxyhexanoic acid ligands, acetoxy-functionalized mercaptoethanol ligands, or acetoxy-functionalized 6-mercapto-1-hexanol ligands coupled to the PbS or ZnS core.

The foregoing will become more apparent from the following detailed description, which proceeds with reference to the accompanying figures.

DETAILED DESCRIPTION

I. Introduction

Figure 1:
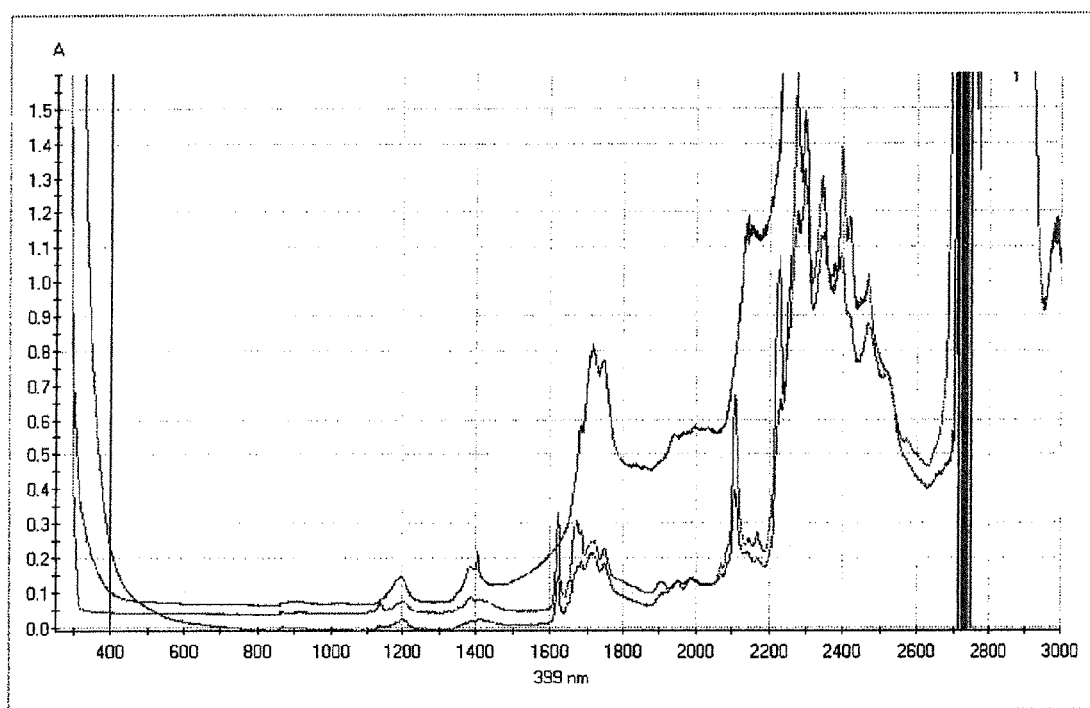
FIG. 1 is an IR spectrum (absorbance versus wavelength) obtained from a film (1 mm thickness) of AHA-functionalized ZnS nanoparticles (50%) in HDDA.

The following explanations of terms and methods are provided to better describe the present disclosure and to guide those of ordinary skill in the art in the practice of the present disclosure. The singular forms "a," "an," and "the" refer to one or more than one, unless the context clearly dictates otherwise. For example, the term "comprising the compound" includes single or plural molecules and is considered equivalent to the phrase "comprising at least one compound." The term "or" refers to a single element of stated alternative elements or a combination of two or more elements, unless the context clearly indicates otherwise. As used herein, "comprises" means "includes." Thus, "comprising A or B," means "including A, B, or A and B," without excluding additional elements. A wavy line ("∼"), is used to indicate a bond disconnection, a dashed line ("- - -") is used to illustrate that a bond may or may not be formed at a particular position, and "⁓" line is used to illustrate optional isomers (e.g., in an olefin, a ⁓ line indicates that the olefin may be the Z (or cis) or E (or trans)) isomer. A person of ordinary skill in the art would recognize that the definitions and formulas provided herein are not intended to include impermissible substitution patterns (e.g., pentavalent carbon, and the like). Accordingly, any bond indicated as being optional may be excluded from a particular formula where the bond's presence would produce an impermissible substitution pattern. Such impermissible substitution patterns are easily recognized by a person of ordinary skill in the art.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting.

In order to facilitate review of the various examples of this disclosure, the following explanations of specific terms are provided:

Aliphatic: A saturated or unsaturated monovalent hydrocarbon having a number of carbon atoms ranging from at least one to about 40 (e.g., $C_{1-40}$alkyl), which is derived from removing one hydrogen atom from one carbon atom of a parent compound (e.g., alkane, alkene, alkyne).

Aliphatic-carbonylamino: -aliphaticC(O)N($R^b$)$_2$, wherein each $R^b$ independently is selected from hydrogen, alkyl, substituted alkyl, alkenyl, substituted alkenyl, alkynyl, substituted alkynyl, aryl, substituted aryl, cycloalkyl, substituted cycloalkyl, cycloalkenyl, substituted cycloalkenyl, cycloalkynyl, substituted cycloalkynyl, heteroaryl, substituted heteroaryl, heterocyclyl, substituted heterocyclyl. Also, each $R^b$ may optionally be joined together with the nitrogen atom to which they are bound to form a heterocyclyl or substituted heterocyclyl group, provided that both $R^b$ are not both hydrogen.

Alkenyl: A unsaturated monovalent hydrocarbon having a number of carbon atoms ranging from at least two to 40 (e.g., $C_{2-40}$alkenyl), which has at least one carbon-carbon double bond and is derived from removing one hydrogen atom from one carbon atom of a parent alkene. An alkenyl group may be branched, straight-chain, cyclic, cis, or trans.

Alkoxy: —O-alkyl (e.g., methoxy, ethoxy, n-propoxy, isopropoxy, n-butoxy, t-butoxy, sec-butoxy, n-pentoxy).

Alkyl: A saturated or unsaturated monovalent hydrocarbon having a number of carbon atoms ranging from at least one to about 40 (e.g., $C_{1-40}$alkyl), which is derived from removing one hydrogen atom from one carbon atom of an alkane. An alkyl group may be branched, straight-chain, or cyclic.

Alkynyl: A unsaturated monovalent hydrocarbon having a number of carbon atoms ranging from at least two to 40 (e.g., $C_{2-40}$alkynyl), which has at least one carbon-carbon triple bond and is derived from removing one hydrogen atom from one carbon atom of a parent alkyne. An alkynyl group may be branched, straight-chain, or cyclic.

Amino: —NH$_2$.

Aminoacyl: —NR$^a$C(O)alkyl, —NR$^a$C(O)substituted alkyl, —NR$^a$C(O)cycloalkyl, —NR$^a$C(O)substituted cycloalkyl, —NR$^a$C(O)alkenyl, —NR$^a$C(O)substituted alkenyl, —NR$^a$C(O)cycloalkenyl, —NR$^a$C(O)substituted cycloalkenyl, —NR$^a$C(O)alkynyl, —NR$^a$C(O)substituted alkynyl, —NR$^a$C(O)aryl, —NR$^a$C(O)substituted aryl, —NR$^a$C(O)heteroaryl, —NR$^a$C(O)substituted heteroaryl, —NR$^a$C(O)heterocyclyl, and —NR$^a$C(O)substituted heterocyclyl, wherein $R^a$ is selected from hydrogen, alkyl, alkenyl, alkynyl, aryl, cycloalkyl, cycloalkenyl, and cycloalkynyl.

Aminocarbonylamino: —$NR^aC(O)N(R^b)_2$, wherein $R^a$ and each $R^b$ are as defined herein. This group may also be generally referred to in the art as a urea group or carbamide group, but is not limited to $H_2NC(O)NH_2$.

Amino(carboxyester): —$NR^a$—C(O)O-aliphatic, —$NR^a$—C(O)O— substituted aliphatic, —$NR^a$—C(O)O-aryl, —$NR^a$—C(O)O-substituted aryl, —$NR^a$—C(O)O-cycloaliphatic, —$NR^a$—C(O)O-substituted cycloaliphatic, —$NR^a$—C(O)O-heteroaryl, —$NR^a$—C(O)O-substituted heteroaryl, —$NR^a$—C(O)O-heterocyclyl, and —$NR^a$—C(O)O-substituted heterocyclyl, wherein $R^a$ is as recited herein. This group may also be generally referred to in the art as a carbamate group.

Aminosulfonyl: —$NR^aSO_2$aliphatic, —$NR^aSO_2$substituted aliphatic, —$NR^aSO_2$cycloaliphatic, —$NR^aSO_2$substituted cycloaliphatic, —$NR^aSO_2$aryl, —$NR^aSO_2$substituted aryl, —$NR^aSO_2$heteroaryl, —$NR^aSO_2$substituted heteroaryl, —$NR^aSO_2$heterocyclyl, —$NR^aSO_2$substituted heterocyclyl, wherein each $R^a$ independently is as defined herein.

Aryl: A monovalent aromatic hydrocarbon group having 6 to 15 carbon atoms (e.g., $C_{6-15}$aryl), which is derived by removing one hydrogen atom from a single carbon atom of the parent ring system.

Carbonylamino: —$C(O)N(R^b)_2$, wherein each $R^b$ is as provided herein.

Carbonylhydrazide: —$C(O)NR^aN(R^b)_2$, wherein $R^a$ and each $R^b$ are as provided herein.

Carbonylthio: —$C(O)SR^a$, wherein $R^a$ is as provided herein.

Carboxyester: —C(O)O-aliphatic, —C(O)O— substituted aliphatic, —C(O)O-aryl, —C(O)O-substituted aryl, —C(O)O-cycloaliphatic, —C(O)O-substituted cycloaliphatic, —C(O)O-heteroaryl, —C(O)O-substituted heteroaryl, —C(O)O-heterocyclyl, and —C(O)O-substituted heterocyclyl.

Carboxyl: —COOH or salts thereof.

Cyano: —CN.

Cycloaliphatic: A cyclic version of an aliphatic group, typically having from three to about ten carbon atoms. Typical cycloaliphatic groups include, but are not limited to, cycloalkyl, cycloalkenyl, cycloalkynyl, such as cyclopropyl; cyclobutyl (e.g., cyclobutanyl and cyclobutenyl), cyclopentyl (e.g., cyclopentanyl and cyclopentenyl), cyclohexyl (e.g., cyclohexanyl and cyclohexenyl), and the like. This term also encompasses polycyclic compounds comprising two or more rings.

Haloaliphatic: An aliphatic group wherein one or more hydrogen atoms are replaced with a halogen atom.

Halogen: Includes fluoro, chloro, bromo and iodo.

Heteroaliphatic: An alkyl, alkenyl, or alkynyl group, wherein one or more of the carbon atoms are each independently replaced with one or more heteroatoms.

Heteroaryl: A monovalent heteroaromatic group having 5 to 14 ring atoms, which is derived from removing one hydrogen atom from a single atom of the parent ring system. This term encompasses polycyclic aromatic compounds comprising two or more rings, wherein at least one ring is aromatic.

Heteroatom: Any atom that is not carbon or hydrogen. Examples include, but are not limited to, nitrogen, oxygen, sulfur, selenium, phosphorus, boron, chlorine, bromine, fluorine, and iodine.

Heterocycloaliphatic (or Heterocyclyl): A cyclic version of a heteroaliphatic group wherein a heteroatom can occupy a position that is attached to the remainder of the molecule.

Hydrazide: —$NR^aN(R^b)_2$, wherein $R^a$ and each $R^b$ independently are as defined herein.

Hydroxyl: —OH.

Oxyacyl: —OC(O)aliphatic, wherein aliphatic is as defined herein.

Oxyaryl: —O-aryl.

Oxycarbonylamino: —O—$C(O)N(R^b)_2$, wherein each $R^b$ independently is as defined herein.

Oxy(carboxyester): —O—C(O)O-aliphatic, —O—C(O)O— substituted aliphatic, —O—C(O)O-aryl, —O—C(O)O-substituted aryl, —O—C(O)O-cycloaliphatic, —O—C(O)O-substituted cycloaliphatic, —O—C(O)O-heteroaryl, —O—C(O)O-substituted heteroaryl, —O—C(O)O-heterocyclyl, and —O—C(O)O-substituted heterocyclyl. This group may also be generally referred to in the art as a carbonate.

Oxy(cycloaliphatic): —O-cycloaliphatic.

Oxyheteroaryl: —O-heteroaryl.

Oxyheterocyclyl: —O-heterocycyl.

Phosphine: —$PR^a_3$.

Phosphonate: —$P(O)(OR^a)_2$, wherein each $R^a$ independently is as defined herein.

Substituted: A fundamental functional group as provided herein, such as an aryl or aliphatic group, or a radical thereof, having coupled thereto, typically in place of a hydrogen atom, a second substituent. Examples of a second substituent include, but are not limited to, alkoxy, acyl, carbonylamino, carboxyester, oxy(carboxyester), oxyacyl, amino(carboxyester), amino, aminoacyl, aminocarbonylamino, oxycarbonylamino, aminosulfonyl, aryl, oxyaryl, thioaryl, carboxyl, cyano, cycloaliphatic, oxycycloaliphatic (—O-cycloaliphatic), thiocycloaliphatic (—S-cycloaliphatic), halogen (e.g., Br, Cl, F, I), hydroxy, heteroaryl, oxyheteroaryl, thioheteroaryl, heterocyclic, oxyheterocyclyl, thioheterocyclyl, nitro, $SO_3H$, sulfonylamino, sulfonyl, sulfoxide, carbonylthio, thioacyl, thiol, and thioaliphatic. The fundamental functional group typically may be substituted with from 1 to 5 of these substituents.

Sulfonyl: —$SO_2$-aliphatic, —$SO_2$-substituted aliphatic, —$SO_2$-cycloaliphatic, —$SO_2$-substituted cycloaliphatic, —$SO_2$-aryl, —$SO_2$-substituted aryl, —$SO_2$-heteroaryl, —$SO_2$-substituted heteroaryl, —$SO_2$-heterocyclyl, and —$SO_2$-substituted heterocyclyl.

Sulfonylamino: —$SO_2N(R^b)_2$, wherein each $R^b$ independently is as defined herein.

Sulfoxide: —S(O)-aliphatic, —S(O)-substituted aliphatic, —S(O)-cycloaliphatic, —S(O)-substituted cycloaliphatic, —S(O)-aryl, —S(O)-substituted aryl, —S(O)-heteroaryl, —S(O)-substituted heteroaryl, —S(O)-heterocyclyl, and —S(O)-substituted heterocyclyl.

Surface exchange ligand: A ligand that may be used to further functionalize a nanoparticle by replacing one or more surface ligands bound to the nanoparticle.

Surface ligand: A ligand that may be coupled to a nanoparticle to promote solubility of the nanoparticle.

Thioaryl: —SC(O)aliphatic, wherein aliphatic is as defined herein.

Thioaliphatic: —S-aliphatic, wherein aliphatic is as defined herein.

Thioaryl: —S-aryl, wherein aryl is as defined herein.

Thio(cycloaliphatic): —S-cycloaliphatic.

Thioheteroaryl: —S-heteroaryl. This term also encompasses oxidized forms of sulfur, such as —S(O)-heteroaryl, or —$S(O)_2$-heteoaryl.

Thioheterocyclyl: —S-heterocycyl. This term also encompasses oxidized forms of sulfur, such as —S(O)-heterocyclyl, or —S(O)$_2$-heterocyclyl.

Thiol: —SH.

Thiocarbonyl: (=S).

II. Nanoparticles

Disclosed herein are nanoparticles that may be functionalized with one or more surface ligands, surface exchange ligands, and combinations thereof. Typically, the nanoparticle has a core which may be functionalized with one or more of the ligands disclosed herein, but in some embodiments, the nanoparticle may be a core-shell nanoparticle, or doped derivatives thereof. Generally, the nanoparticle is synthesized in the presence of a ligand compound, as disclosed herein.

A. Nanoparticle Component

The nanoparticle is selected to have a size suitable for inclusion into nanocomposites that allow light of a particular wavelength to be transmitted without light scattering. The nanoparticle typically may have a diameter ranging from about 2 nm to about 50 nm, with certain embodiments ranging from about 2 nm to about 40 nm, about 2 nm to about 30 nm, about 2 nm to about 20 nm, about 2 nm to about 15 nm, or about 2 nm to about 10 nm. In exemplary embodiments, the nanoparticle typically has a diameter ranging from about 2 nm to about 15 nm. In particular disclosed embodiments, the nanoparticle may be in the shape of a sphere, a spheroid, a cylinder, or an ellipsoid.

In particular disclosed embodiments, the nanoparticle is made of a material that has a high refractive index. The material may be a metal, mixed metal system, or ceramic, and combinations of different nanoparticles may be used. For example, the nanoparticle may comprise a core, such as a quantum dot, and a shell, such as a semiconducting material. Exemplary nanoparticles include, but are not limited to BaTiO$_3$, SiC, CdTe, Si, ZnTe, PbS, ZnS, Ge, MoSi$_2$, MoS$_2$, GaAs, InP, Fe$_2$O$_3$, Fe$_3$O$_4$, TiO$_2$, ZrO$_2$, ZrSiO$_4$, Al$_2$O$_3$, MgAl$_2$O$_4$, SiO$_2$, ZnO, LiF$_3$, LaBr$_3$, YVO$_4$, YVBO$_4$, CdSe, PbSe, InSb, nanodiamond, and GaP. In particular disclosed embodiments, the nanoparticle is a metal sulfide nanoparticle, such as PbS, ZnS, or MoS$_2$, that provides transmission in the UV infrared and visible spectral ranges. In particular disclosed embodiments, the nanoparticle is selected to be other than a metal oxide, such as alumina, zirconia, titania, or mixtures/mixed oxides thereof.

B. Ligand Component

In particular disclosed embodiments, a surface ligand may be used to functionalize the nanoparticle core via the core's surface (or shell, if a core-shell nanoparticle is involved) to achieve a desired stability, solubility, and/or reactivity. The surface ligand typically is selected to provide improved solubility in one or more of the polymerizable components disclosed herein. By improving the nanoparticle's solubility, the surface ligands can prevent the nanoparticles from agglomerating.

Surface ligands couple to the nanoparticle and help inhibit aggregation, and also promote dissolution of the nanoparticle into a solution. The surface ligand typically comprises a functional group capable of coupling with the nanoparticle surface. The nanoparticle-ligand interaction may be electrostatic, coordinate, or covalent. In particular disclosed embodiments, the functional group capable of coupling with the nanoparticle surface may be selected from carboxyl, carbonylamino, carbonylthio, carbonylhydrazide, amino, hydroxyl, thiol, hydrazide, phosphonate, and phosphine.

In certain disclosed embodiments, the surface ligand may comprise a non-polar portion. In these embodiments, the non-polar portion may be selected from an aliphatic group, such as $C_{1-40}$alkyl, $C_{2-40}$alkenyl, $C_{2-40}$alkynyl; a cycloaliphatic group, such as $C_{3-10}$cycloalkyl, and $C_{4-10}$cycloalkenyl; and an aromatic group, such as $C_{6-14}$aryl.

In particular disclosed embodiments, the surface ligand may have a formula as provided below.

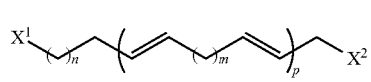

Formula 1

With reference to Formula 1, each of $X^1$ and $X^2$ independently may be selected from hydrogen, methyl, carboxyl, carbonylamino, carbonylthio, carbonylhydrazide, amino, hydroxyl, thiol, hydrazide, phosphonate, and phosphine; n may range from 0 to about 38; m may be 0, 1, 2, or 3; and p may be 0, 1, 2, 3, 4, 5, or 6. In particular disclosed embodiments, p is zero, $X^1$ is carboxyl, and $X^2$ is methyl. In yet further embodiments, p is zero, $X^1$ is thiol, and $X^2$ is methyl. In yet other embodiments, p is zero, $X^1$ is hydroxyl, and $X^2$ is thiol. Exemplary surface ligands include, but are not limited to, fatty acids and thiols. Fatty acids include monounsaturated and polyunsaturated fatty acids, which may be short-chain, medium-chain or long-chain fatty acids.

In particular disclosed embodiments, the surface ligand may have a formula 2, illustrated below, wherein the $C_{4-12}$aliphatic group may be a saturated alkyl group or an unsaturated alkenyl group, and Z is selected from thiol or carboxyl.

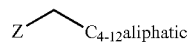

Formula 2

In exemplary embodiments, the surface ligand may be a fatty acid may be selected from myristoleic acid, palmitoleic acid, sapienic acid, oleic acid, elaidic acid, linoleic acid, arachidonic acid, lauric acid, myristic acid, palmitic acid, stearic acid, arachidic acid, and the like. Thiol surface ligands include thiol-terminated hydrocarbon chains, such as octadecanethiol, dodecanethiol, decanethiol, hexadecanethiol, and the like.

In particular disclosed embodiments, the surface ligand may be a bidentate ligand having one of the formulas provided below.

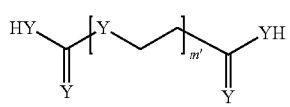

Formula 3

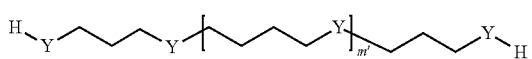

Formula 4

With reference to Formulas 3 and 4, each Y independently may be selected from oxygen, sulfur, and $NR^2$ wherein $R^2$ may be selected from hydrogen, aliphatic (such as alkyl, substituted alkyl, alkenyl, substituted alkenyl, alkynyl, substituted alkynyl), aryl, substituted aryl, cycloaliphatic (such as cycloalkyl, substituted cycloalkyl, cycloalkenyl, substituted cycloalkenyl, cycloalkynyl, and substituted cycloalkynyl); and each m' independently may be selected from 1 to about 20, or from 1 to about 15, or from 1 to about 12, or from 1 to about 10, or from 1 to about 5. In exemplary embodiments, the bidentate ligand may be selected from amine-terminated polytetrahydrofuran, carboxy terminated polyethylene glycol, thiol terminated analogs, and the like.

In particular disclosed embodiments, the surface ligand may further comprise one or more additional functional groups capable of imparting compatibility with the polymerizable components disclosed herein. For example, the surface ligand may comprise a polar portion in addition to the functional group capable of coupling to the nanoparticle. The polar portion may be a terminal functional group selected from oxyacyl, aminoacyl, thioacyl, oxyacryloyl, aminoacryloyl, thioacryloyl, hydroxyl, thiol, and amino. In particular disclosed embodiments, the ligand may comprise a hydrocarbon chain that links the functional groups capable of coupling to with the nanoparticle and the polar portion. The length of this hydrocarbon chain can be substantially similar to that of a hydrocarbon chain present in the polymerizable component. Solely by way of example, the hydrocarbon chain may have two fewer (or two more) carbon atoms than the polymerizable component. So, in this example, if the polymerizable component comprises a hydrocarbon chain of six carbon atoms, then the surface ligand used to functionalize the nanoparticle typically is selected to have a hydrocarbon chain of anywhere from about four carbon atoms to about eight carbon atoms; more typically five carbon atoms to seven carbon atoms; more typically six carbon atoms. While the length of the hydrocarbon chains of the polymerizable component and the surface ligand may be substantially similar, this feature is not required.

In particular disclosed embodiments, the surface ligand is a monodentate ligand having a Formula 5 as illustrated below.

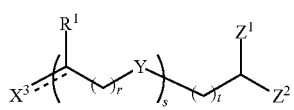

Formula 5

With reference to Formula 5, $R^1$ may be selected from hydrogen, alkyl, substituted alkyl, alkenyl, substituted alkenyl, alkynyl, substituted alkynyl, aryl, substituted aryl, cycloalkyl, and substituted cycloalkyl; Y may be selected from oxygen, sulfur, $NR^2$ wherein $R^2$ may be selected from hydrogen, alkyl, substituted alkyl, alkenyl, substituted alkenyl, alkynyl, substituted alkynyl, aryl, substituted aryl, cycloalkyl, and substituted cycloalkyl; $X^3$ may be selected from oxygen, sulfur, $NR^2$, hydroxyl, thio, and $N(R^2)_2$ wherein each $R^2$ independently is selected from hydrogen, alkyl, substituted alkyl, alkenyl, substituted alkenyl, alkynyl, substituted alkynyl, aryl, substituted aryl, cycloalkyl, and substituted cycloalkyl; Z' may be selected from carboxyl, carbonylamino, carbonylthio, carbonylhydrazide, amino, hydroxyl, thiol, hydrazide, phosphonate, and phosphine; $Z^2$ may be selected from hydrogen, hydroxyl, alkoxy, amino, thiol, and thioether; r may be 0, 1, 2, or 3; and s and t independently may range from 0 to 20.

In particular disclosed embodiments, the ligand may have a formula according to either Formula 6 or 7, provided below.

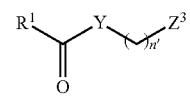

Formula 6

With reference to Formula 6, $R^1$ may be selected from hydrogen, alkyl, substituted alkyl, alkenyl, substituted alkenyl, alkynyl, substituted alkynyl, aryl, substituted aryl, cycloalkyl, and substituted cycloalkyl; Y may be selected from oxygen, sulfur, $NR^2$ wherein $R^2$ may be selected from hydrogen, alkyl, substituted alkyl, alkenyl, substituted alkenyl, alkynyl, substituted alkynyl, aryl, substituted aryl, cycloalkyl, and substituted cycloalkyl; $Z^3$ may be selected from carboxyl, carbonylamino, carbonylthio, carbonylhydrazide, amino, hydroxyl, thiol, hydrazide, phosphonate, and phosphine; and n may range from 1 to 20; more typically n' ranges from 1 to 12; even more typically from 1 to 10; even more typically from 1 to 6. In particular disclosed embodiments, $R^1$ may be selected from alkenyl and alkynyl and thereby provide an olefin (or (meth)acrylate) suitable for polymerization. In particular disclosed embodiments, the surface ligand is capable of polymerizing and therefore the nanoparticle can be covalently incorporated directly into a polymer matrix. In other embodiments, the nanoparticle is not covalently incorporated into the polymer matrix, but rather is dispersed in the polymer matrix.

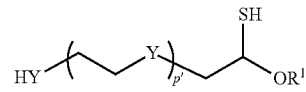

Formula 7

With reference to Formula 7, $R^1$ may be selected from hydrogen, alkyl, substituted alkyl, alkenyl, substituted alkenyl, alkynyl, substituted alkynyl, aryl, substituted aryl, cycloalkyl, and substituted cycloalkyl; each Y may be selected from oxygen, sulfur, $NR^2$ wherein $R^2$ may be selected from hydrogen, alkyl, substituted alkyl, alkenyl, substituted alkenyl, alkynyl, substituted alkynyl, aryl, substituted aryl, cycloalkyl, and substituted cycloalkyl; and p' may range from 1 to 20.

In particular disclosed embodiments, $R^1$ may be selected from alkenyl, alkynyl, acryloyl (or (meth)acryloyl) and thereby provide an olefin or acrylate (or (meth)acrylate) suitable for polymerization. In these embodiments, the surface ligand is capable of polymerizing and therefore the nanoparticle can be covalently incorporated directly into a polymer matrix. In other embodiments, the nanoparticle is not covalently incorporated into the polymer matrix, but rather is dispersed in the polymer matrix.

In certain disclosed embodiments, the surface ligand may be a mercaptoalcohol. For example, the surface ligand may be selected from mercaptoethanol, 3-mercapto-1-propanol, 4-mercapto-1-butanol, 5-mercapto-1-pentanol, 6-mercapto-1-hexanol, 7-mercapto-1-heptanol, 8-mercapto-1-octanol, 9-mercapto-1-nonanol, 10-mercapto-1-decanol, 11-mercapto-1-undecanol, 12-mercapto-1-dodecanol, and other α-mercapto-ω-alcohols having from about 1 to about 20 carbon atoms, and combinations thereof. In particular disclosed embodiments, the nanoparticle is resistant to aggregation for extended periods of time both in solution and the dry solid state. Typically, metal-sulfide nanoparticles are functionalized with these types of surface ligands, but the present disclosure is not limited to this combination.

Other exemplary surface ligands include, but are not limited to, 6-acetoxyhexanoic acid (AHA), 4-aceteoxybutanoic acid (ABA), acetoxyacetic acid (AAA), 6-acetoxy-1-hexanethiol (6AHT), 2-acetoxy-1-ethanethiol (AET), 4-acetoxy-1-butanethiol (ABT), 6-acryloyloxy-1-hexanethiol (6ACRYLHT), 2-acryloyloxy-1-ethanethiol (ACRYLET), 6-propionyloxy-1-hexanethiol (6PHT), 2-propionyloxy-1-ethanethiol (PET), 4-propionyloxy-1-butanethiol (PBT), 6-butyryloxy-1-hexanethiol (6BHT), 2-butyryloxy-1-ethanethiol (BET), 4-butyryloxy-1-butanethiol (BBT) 6-isobutyryloxy-1-hexanethiol (6iBHT), 2-isobutyryloxy-1-ethanethiol (iBET), 4-isobutyryloxy-1-butanethiol (iBBT), 6-tert-butyryloxy-1-hexanethiol (6tBHT), 2-tert-butyryloxy-1-ethanethiol (tBET), 4-tert-butyryloxy-1-butanethiol (tBBT), 2-(propionyloxy)acetic acid, 2-(butyryloxy)acetic acid, 2-(isobutyryloxy)acetic acid, 2-(pivaloyloxy)acetic acid, 2-(pentanoyloxy)acetic acid, 2-(hexanoyloxy)acetic acid, 3-(hexanoyloxy)propanoic acid, 3-(pentanoyloxy)propanoic acid, 3-(butyryloxy)propanoic acid, 3-(pivaloyloxy)propanoic acid, 3-(isobutyryloxy)propanoic acid, 3-(propionyloxy)propanoic acid, 3-(acetoxy)propanoic acid, 4-(acetoxy)butanoic acid, 4-(propionyloxy)butanoic acid, 4-(butyryloxy)butanoic acid, 4-(isobutyryloxy)butanoic acid, 4-(pivaloyloxy)butanoic acid, 4-(pentanoyloxy)butanoic acid, 4-(hexanoyloxy)butanoic acid, 5-(acetoxy)pentanoic, 5-(propionyloxy)pentanoic acid, 5-(butyryloxy)pentanoic acid, 5-(isobutyryloxy)pentanoic acid, 5-(pivaloyloxy)pentanoic acid, 5-(pentanoyloxy)pentanoic acid, 5-(hexanoyloxy)pentanoic acid, 6-(propionyloxy)hexanoic acid, 6-(butyryloxy)hexanoic acid, 6-(isobutyryloxy)hexanoic acid, 6-(pivaloyloxy)hexanoic acid, 6-(pentanoyloxy)hexanoic acid, 6-(hexanoyloxy)hexanoic acid, 7-(hexanoyloxy)heptanoic acid, 7-(pentanoyloxy)heptanoic acid, 7-(butyryloxy)heptanoic acid, 7-(isobutyryloxy)heptanoic acid, 7-(pivaloyloxy)heptanoic acid, 7-(propionyloxy)heptanoic acid, 7-(acetoxy)heptanoic acid 6-(acryloyloxy)hexanoic acid, 6-(methacryloyloxy)hexanoic acid, 4-(acryloyloxy)butanoic acid, 4-(methacryloyloxy)butanoic acid, (acryloyloxy)acetic acid, (methacryloyloxy)acetic acid, 7-(acryloyloxy)heptanoic acid, 7-(methacryloyloxy)heptanoic acid, 5-(acryloyloxy)pentanoic acid, 5-(methacryloyloxy)pentanoic acid, diethylene glycol monomethyl ether thiol, triethylene glycol monomethyl ether thiol, tetraethylene glycol monomethyl ether thiol, low molecular weight olio-ethylene glycol monomethyl ether thiol, benzenethiol, toluenethiol, alkylthiolbenzenes, and combinations thereof.

In particular disclosed embodiments, the surface ligand may be synthesized using a method illustrated in any one of Schemes 1 and 2.

Scheme 1

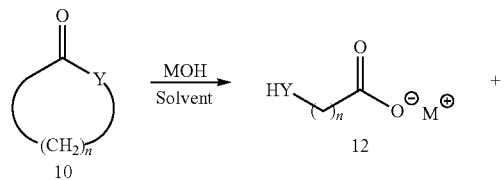

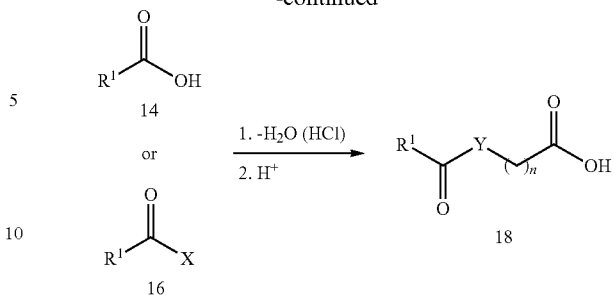

With reference to Scheme 1, Y is selected from oxygen, sulfur, or $NR^2$ wherein $R^2$ is selected from hydrogen, alkyl, substituted alkyl, alkenyl, substituted alkenyl, alkynyl, substituted alkynyl, aryl, substituted aryl, cycloalkyl, and substituted cycloalkyl; and n is as provided herein. Variable "X" may be a leaving group selected from halogen (e.g., chloro, bromo, iodo, and fluoro), a mesyl group (—OMs), a tosyl group (—OTs), a besyl group (—OBs), a triflate group (—OTf) and the like; M may be a metal, such as a Group I metal, selected from potassium, sodium, lithium, and the like. The solvent typically is a protic, polar solvent, such as methanol, ethanol, isopropanol, butanol, and the like. In particular embodiments, a cyclic starting material 10 undergoes base-mediated ring opening to provide compound 12. This compound may then be combined with either a suitable carboxylic acid derivative 14 and undergo acid-catalyzed esterification to provide the desired ligand 18. Alternatively, compound 12 can be combined with carbonyl-containing compound 16, wherein a base may be used to drive this reaction to completion, particularly when the carbonyl-containing compound 16 is an acid halide.

Scheme 2

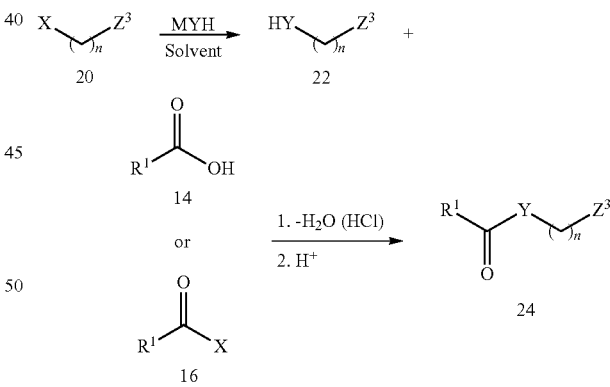

With reference to Scheme 2, Y, X, and n are as provided for Scheme 1, and $Z^3$ is as disclosed herein. According to Scheme 2, starting material 20 is converted to intermediate 22, which is then converted to the desired ligand 24 via acid-catalyzed esterification with carboxylic acid derivative 14 or a base-driven reaction with carbonyl-containing compound 16, using similar conditions as those provided in Scheme 1.

An exemplary method of synthesizing the surface ligand is illustrated in Scheme 3, below. With reference to Scheme 3, the starting material, ε-caprolactone 30, undergoes ring opening upon base addition, thereby providing the openchained salt compound 32. The resulting salt may then undergo acid-catalyzed esterification with acetic acid (34) to provide surface ligand 36.

Scheme 3

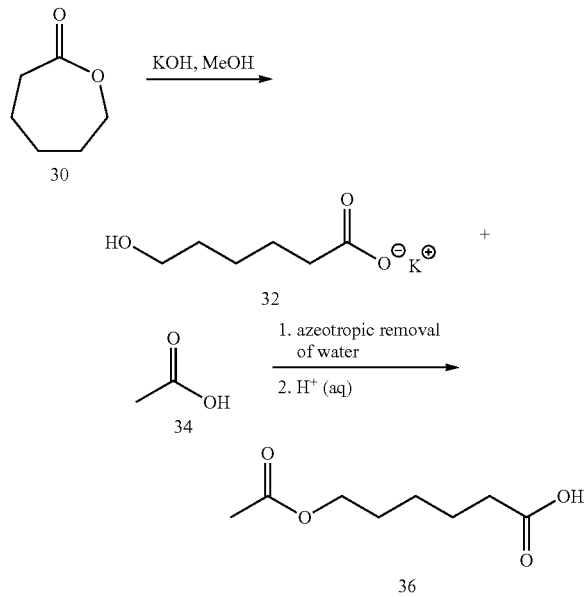

In other exemplary embodiments, the surface ligand may be synthesized using the method illustrated in Scheme 4, below. With reference to Scheme 4, acyclic starting material 40 may be treated with KOH in methanol to provide salt 42. This salt may then undergo acid-catalyzed esterification with an appropriate acid (44), or acid chloride (46), as illustrated in Scheme 4 to provide the desired surface ligand 48.

Scheme 4

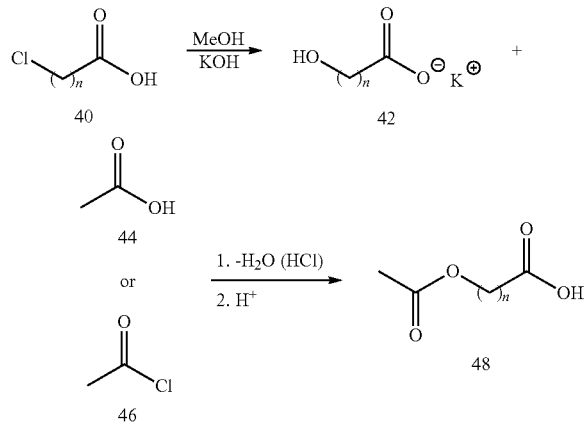

III. Polymerizable Component

Disclosed herein are embodiments of a polymerizable component that is suitable for acting as a medium for depositing the disclosed functionalized nanoparticles in order to provide optical materials having specific refractive index variations. In particular disclosed embodiments, the polymerizable component is a high clarity, low viscosity monomer that is capable of being cured. Polymerizable component selection also may be made based on the refractive index of the particular material and/or the viscosity of the material. In particular disclosed embodiments, the refractive index may range from about 1.2 to about 1.8, with particular disclosed embodiments having a refractive index of about 1.45 to about 1.55. The polymerizable component also may have a viscosity ranging from about 5 cP to about 20 cP, from about 10 cP to about 20 cP, or from about 10 cP to about 15 cP. In particular disclosed embodiments, the temperature used for deposition may be adjusted in order to deposit polymerizable component materials (with or without addition of the disclosed nanoparticles) that have higher viscosity at room temperature (which can typically range from about 20° C. to about 25° C.). For example, the temperature may be increased to about 10° C. to about 60° C. above room temperature. The temperature therefore may range from about 20° C. to about 80° C., or from about 20° C. to about 75° C., or from about 20° C. to about 70° C., or from about 35° C. to about 70° C.

In particular disclosed embodiments, the polymerizable component comprises one or more moieties that can undergo polymerization, such as an olefin, acrylate (or substituted acrylate), and a $C_2$heterocyclyl (e.g., epoxides, aziridines, and the like). The selected polymerizable component may be one compound, or may comprise a mixture of various different compounds (such as a comonomer or copolymer).

An acrylate moiety comprises a carbonyl group and a polymerizable olefinic portion. The acrylate may be substituted with one or more alkyl groups (e.g., methyl, ethyl, propyl, butyl, etc.). In particular disclosed embodiments, the polymerizable component is a monomer that comprises 1 to 4 acrylate moieties. The monomer also may comprise a mixture of monomers having a different number of arylate groups or other functional groups.

In particular disclosed embodiments, the polymerizable component comprises an aliphatic chain. For example, the polymerizable component may be a monomer comprising an aliphatic chain of from 1 to about 30 carbon atoms; more typically from 1 to about 20 carbon atoms; even more typically from 1 to about 15 carbon atoms. In exemplary embodiments, the monomer comprises an alkyl chain of 2 to 10 carbon atoms; or from 2 to 6 carbon atoms.

Exemplary polymerizable components include, but are not limited to, hexanediol-diacrylate (HDDA), methyl acrylate, ethyl acrylate, butyl acrylate, isobutyl acrylate, tert-butyl acrylate, n-hexyl acrylate, ethylhexyl acrylate, n-octyl acrylate, isooctyl acrylate, n-decyl acrylate, n-dodecyl acrylate, n-hexadecyl acrylate, n-octadecyl acrylate, isobornyl acrylate, benzyl acrylate, phenyl acrylate, low molecular weight oligio-ethylene glycol monomethyl ether acrylate, ethylene glycol monomethyl ether acrylate, diethyleneglycol monomethyl ether acrylate, triethylene glycol monomethyl ether acrylate, tetraethylene glycol monomethyl ether acrylate, diethylene glycol diacrylate, triethylene glycol diacrylate, tetraethylene glycol diacrylate, low molecular weight oligio-ethylene glycol diacrylate, trimethylolpropane triacrylate, pentaerythritol tetraacrylate, neopentyl glycol diacrylate (2,2-dimethyl-1,3-propanediol diacrylate), 1,10-decanediol diacrylate, hexanediol-dimethacrylate, ethyl methacrylate, butyl methacrylate, isobutyl methacrylate, text-butyl methacrylate, n-hexyl methacrylate, ethylhexyl methacrylate, n-octyl metacrylate, isoocty1 methacrylate, n-decyl methacrylate, n-dodecyl methacrylate, n-hexadecyl methacrylate, n-octadecyl methacrylate, benzyl methacrylate, phenyl methacrylate, low molecular weight oligio-ethylene glycol monomethyl ether methacrylate, ethylene glycol monomethyl ether methacrylate, diethyleneglycol monomethyl ether methacrylate, triethylene glycol monomethyl ether methacrylate, tetraethylene glycol monomethyl ether methacrylate, diethylene glycol dimethacrylate, triethylene glycol dimethacrylate, tetraethylene glycol dimethacrylate, low molecular weight oligo-ethylene glycol dimethacrylate, trimethylolpropane trimethacrylate, pentaerythritol tetramethacrylate, neopentyl glycol dimethacrylate (2,2-dimethyl-1,3-propanediol dimethacrylate), 1,10-decanediol dimethacrylate, and combinations thereof.

The polymerizable component disclosed herein is capable of being cured to form a polymer, or to polymerize further. The cured polymer is suitable for use in optical element fabrication. The polymerizable component may be cured when exposed to an energy source, such as a UV or visible light source. In particular disclosed embodiments, a UV LED light source is used. Additionally, the curing step can be conducted under an inert atmosphere (e.g., applying a flow of inert gas, such as argon, nitrogen, and the like) so as to prevent oxygen-mediated inhibition of the curing reaction. The monomer typically is cured after the functionalized nanoparticles have been embedded, dispersed, or covalently integrated in the polymerizable component. In particular disclosed embodiments, small incremental doses of energy (e.g., UV light) are provided thereby allowing the polymerizable component to cure slowly so as to mitigate shrinkage.

In particular disclosed embodiments, the polymerizable component may be cured in the presence of a photoinitiator. A desirable property of the photoinitiator is that it does not contribute to or cause yellowing of the cured material obtained during the curing process. Examples of suitable photoinitiators include, but are not limited to 1-hydroxy-cyclohexyl-phenyl ketone, benzophenone, 2,2-dimethoxy-1,2-diphenylethan-1-one, 1-[4-(2-hydroxyethoxy)-phenyl]-2-hydroxy-2-methyl-1-propane-1-one, 1-hydroxy-cyclohexyl-phenyl-ketone, 2-benzyl-2-dimethylamino-1-(4-morpholinophenyl)-butanone, bis(eta-5-2,4-cylcopentadien-1-yl)-bis(2,6-difluoro-3-(1H-pyrrol-1-yl)-phenyl) titanium, bis(2,4,6-trimethylbenzoyl)-phenylphosphineoxide, bis(2,6-dimethoxybenzoyl)-2,4,4-trimethyl pentylphosphineoxide, 2-hydroxy-2-methyl-1-phenyl-propan-1-one, 2-hydroxy-2-methyl-1-phenyl-propan-1-one-2,4,6-trimethylbenzoyldiphenyl-phosphine oxide, and combinations thereof.

Figure 2:
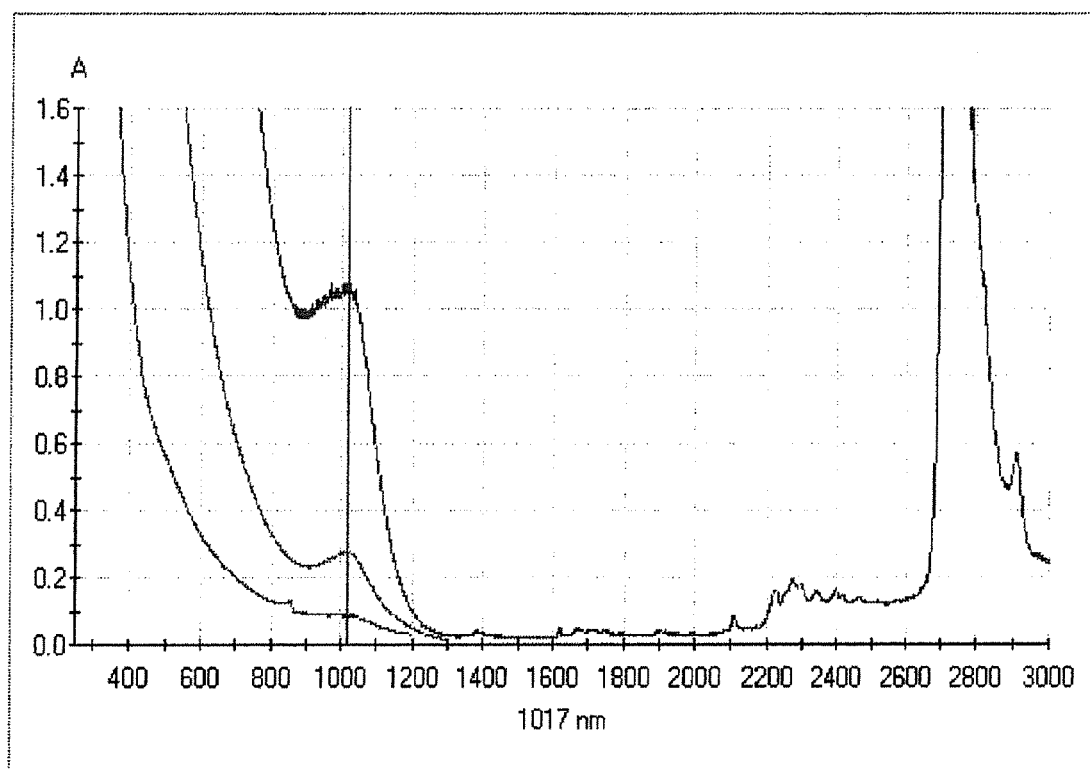
FIG. 2 is an IR spectrum (absorbance versus wavelength) obtained from a film (0.1 mm thickness) of AHA-functionalized PbS nanoparticles (30%) in HDDA.

Also disclosed herein are methods for determining incorporation of the functionalized nanoparticle into the polymerizable component. In particular disclosed embodiments, UV and infrared (IR) spectroscopy are used to analyze the dispersion of the nanoparticles in the polymerizable component, as well dispersed embodiments will have good light transmission. FIGS. 1 and 2 illustrate results obtained from analyzing a thin film of the monomer and dispersed nanoparticles. FIG. 1 is an IR spectrum (measured in absorbance) obtained from a film (1 mm thickness) of AHA-functionalized ZnS nanoparticles (50%) in HDDA. FIG. 2 is an IR spectrum (measured in absorbance) obtained from a film (0.1 mm thickness) of AHA-functionalized PbS nanoparticles (30%) in HDDA.

The surface ligands disclosed herein promote the nanoparticle's ability to exhibit increased solubility in solvents, monomers, and polymers disclosed herein and therefore allow for high concentrations of the functionalized nanoparticle to be dispersed in these components. In particular disclosed embodiments, the concentration of the functionalized nanoparticle may range from about 1% wt/v to about 80% wt/v; more typically from about 10% wt/v to about 75% wt/v, about 65% wt/v, about 50% wt/v, or about 40% wt/v.

IV. Method of Making Functionalized Nanoparticles

Disclosed herein are embodiments of a method for making the functionalized nanoparticles disclosed herein. In particular disclosed embodiments, the functionalized nanoparticles are obtained by either modifying the nanoparticle with a surface ligand during the nanoparticle synthesis or further functionalizing the nanoparticle via a ligand exchange reaction. Further functionalizing, in this context, comprises displacing one or more surface ligands for a different ligand, referred to as a surface exchange ligand. In particular disclosed embodiments, all, or substantially all, of the surface ligands may be displaced. In other embodiments, only a portion of the surface ligands (such as less than 60%, less than 50%, or less than 40%) are displaced by the surface exchange ligands.

A nanoparticle comprising one or more surface ligands may be dissolved in a suitable solvent, such as methylene chloride. A desired surface exchange ligand may then be added to the solution, either neat or as a separate solution. The mixture can then be stirred and/or sonicated for a suitable time. In particular disclosed embodiments, the mixture is sonicated in an ultrasonic bath for anywhere from about 30 minutes to about 2 hours, but a person of ordinary skill in the art would recognize that this time period may be shorter or longer depending on the solvent, the nanoparticle, and the ligand involved. Nanoparticles functionalized with one or more of the surface-exchange ligands may then be isolated by precipitation, such as by adding to the mixture a suitable volume of a non-polar solvent. In particular disclosed embodiments, a 5-fold excess of a non-polar solvent, such as hexane(s), is added to the mixture. The functionalized nanoparticles are then isolated using centrifugation or filtration. The precipitation and isolations steps may be repeated any number of times.

Another method of making the nanoparticle concerns functional group modification of surface ligands attached to the nanoparticle. For example, a nanoparticle may be functionalized with one or more surface ligands that comprise a functional group capable of being chemically modified (that is, a functional group that is not attached to the nanoparticle). In particular disclosed embodiments, the nanoparticle is exposed to a reagent that chemically binds to this functional group. The functional group may be terminal (that is, at the end of the surface ligand) or it may be located internally or at a branched position on the surface ligand. In particular disclosed embodiments, the reagent comprises a carbonyl moiety that becomes bound through a carbon atom of the carbonyl moiety to the functional group of the one or more surface ligands.

The schemes provided below illustrate particular disclosed embodiments wherein various functionalized nanoparticles are synthesized. An example of a ligand exchange reaction as is disclosed herein is provided below in Scheme 5. With reference to Scheme 5, a PbS nanoparticle functionalized with numerous oleic acid surface ligands (50) is combined with a bidentate polymer, such as amine terminated polytetrahydrofuran (ATHF). The nanoparticle undergoes ligand exchange (52), during which the oleic acid ligands are displaced by the bidentate polymer ligands to yield a modified nanoparticle comprising surface-exchange ligands (54).

Scheme 5

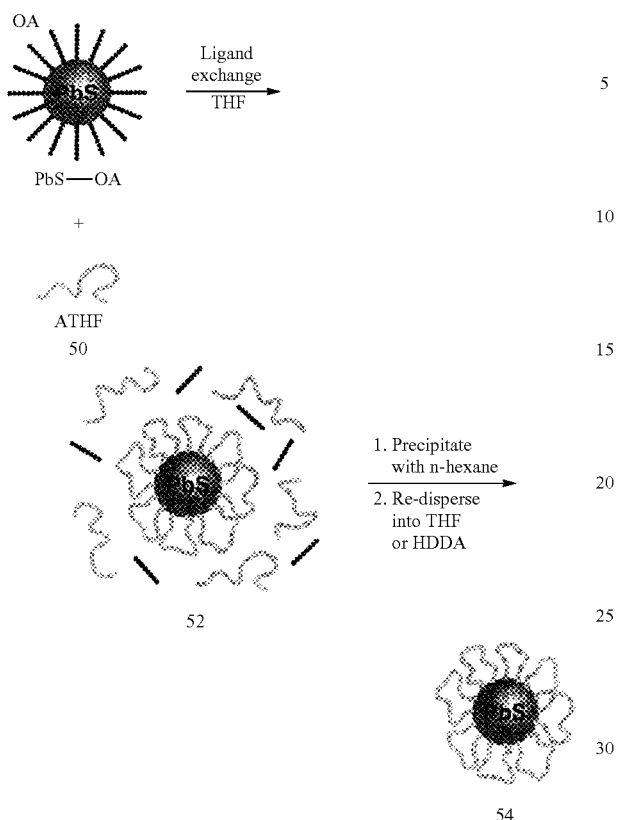

As another example, Scheme 6 illustrates a ZnS nanoparticle (66) functionalized with numerous mercaptoethanol ligands. This particular embodiment is made by reacting zinc acetate (60) with thiourea (62) and mercaptoethanol (64). An additional embodiment is illustrated in Scheme 7, which illustrates a similar conversion to obtain nanoparticle 70, this particular embodiment using 6-mercapto-1-hexanol (72) rather than mercaptoethanol.

Scheme 6

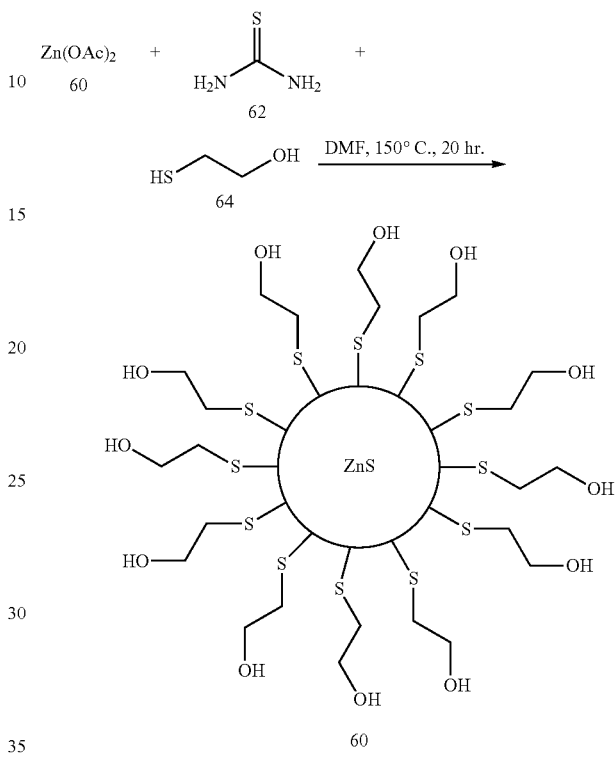

Scheme 7

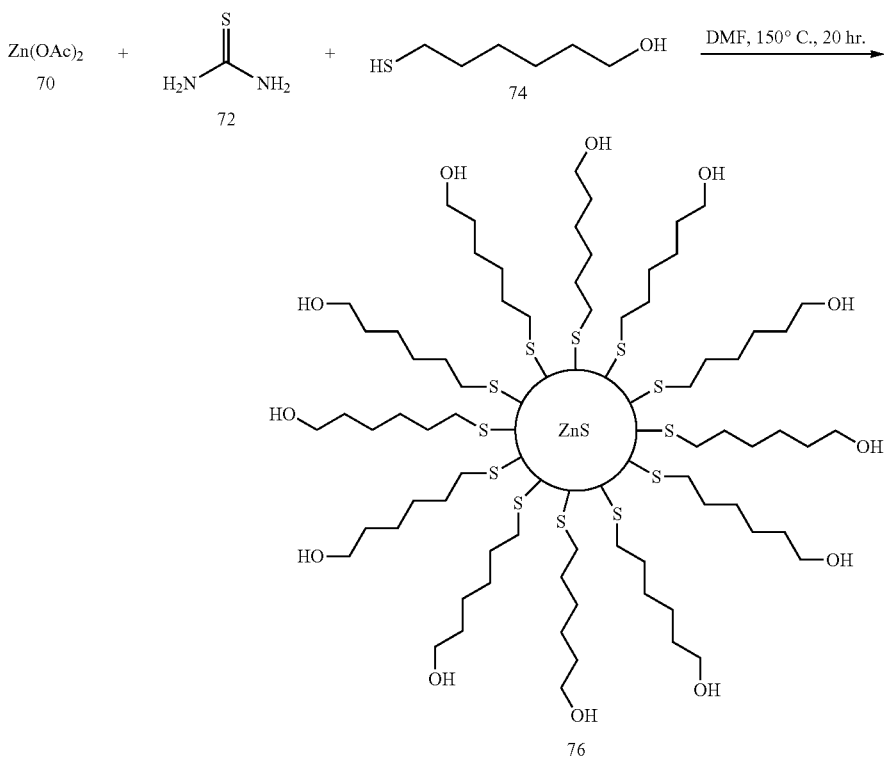

The functionalized nanoparticles can then undergo post-functionalization to provide nanoparticles suitable for use with the disclosed polymerizable component. An exemplary embodiment is provided below in Scheme 8. According to Scheme 8, the mercaptoethanol functionalized ZnS nanoparticle (80) is combined with acetic anhydride to provide an acetoxy-functionalized nanoparticle (82).

functionalized nanoparticles is used, then the solvent may be removed using methods known to those of ordinary skill in the art, such as evaporation, distillation, and the like. The functionalized nanoparticles need not be added to the polymerizable component as a solution, and instead may be added neat. In particular disclosed embodiments, the functionalized nanoparticles are dispersed in the polymerizable

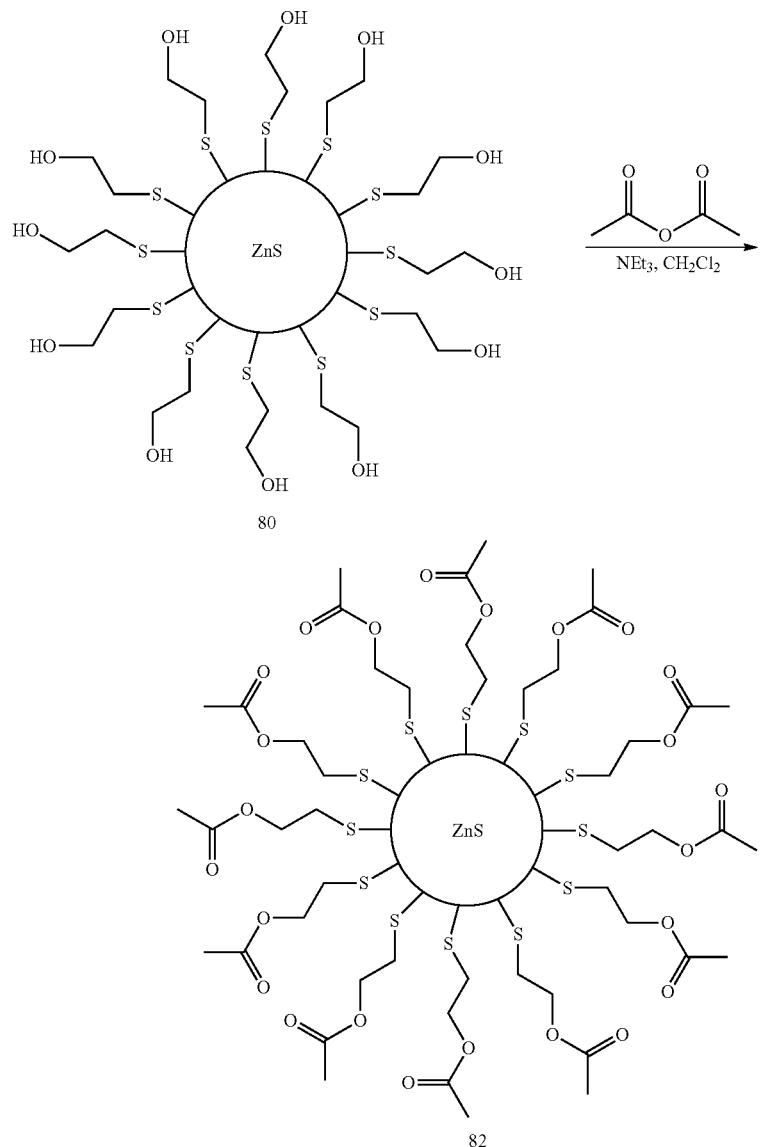

Scheme 8

Once the functionalized nanoparticles comprising one or more surface-exchange ligands are isolated, they may be combined with the polymerizable component. In particular disclosed embodiments, the nanoparticles are dissolved in a solution, using an appropriate solvent (e.g., methylene chloride), and the polymerizable component is then added to this solution. In particular disclosed embodiments, the polymerizable component and nanoparticle are combined at room temperature. Sonication may be used, but is not necessary, to promote further dispersion of the functionalized nanoparticles in the polymerizable component. If a solution of the component using a mechanical high-shear homogenizer. The homogenizer may be operated at speeds ranging from about 10,000 rpm to about 30,000 rpm. Such speeds are selected so as to prevent agglomeration of the nanoparticles.

In particular disclosed embodiments, the ligand exchange reaction may be monitored in order to determine the extent of ligand exchange, identify the nature of the ligand shell surrounding the nanoparticle surface/core, and the presence of excess free ligand (surface ligand and/or surface exchange ligand). In certain embodiments, the ligand exchange reaction is monitored using nuclear magnetic resonance techniques, such as $^1$H NMR.

Figures 3A, 3B:
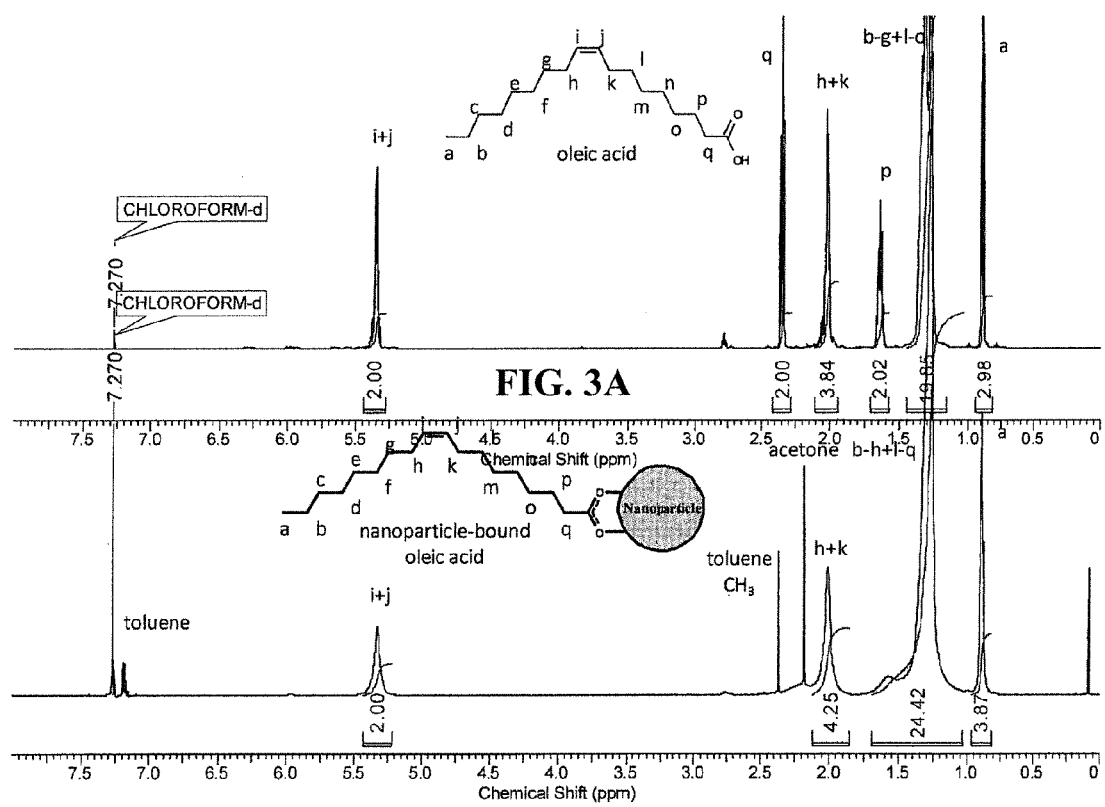
FIGS. 3A and 3B are $^1$H NMR spectra illustrating a spectrum obtained from a free oleic acid surface ligand (FIG. 3A) and the oleic acid surface ligand when bound to a nanoparticle (FIG. 3B).

Results from using $^1$H NMR spectroscopy to monitor particular disclosed embodiments are illustrated in FIGS. 3A, 3B, 4A, and 4B. FIG. 3A is a representative $^1$H NMR spectrum of free oleic acid in CDCl$_3$. FIG. 3B illustrates results obtained when the nanoparticle is functionalized with a surface ligand, such as oleic acid. Most notable is the broadening of the individual peaks of the oleic acid ligand and the loss of resolved splitting observed in the nanoparticle-containing sample. These features corroborate that the surface ligands are coupled to the nanoparticle.

Figures 4A, 4B:
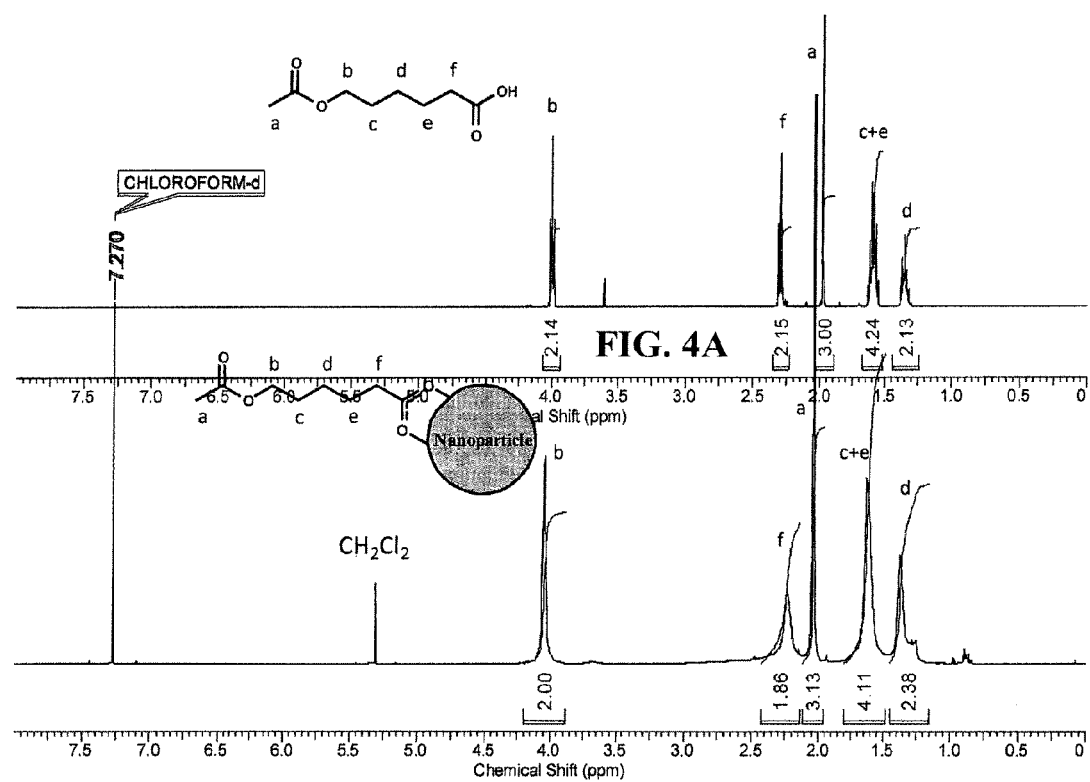
FIGS. 4A and 4B are $^1$H NMR spectra illustrating a spectrum obtained from a free AHA-surface ligand (FIG. 4A) and the same AHA-surface ligand when bound to a nanoparticle (FIG. 4B).
Figure 5:
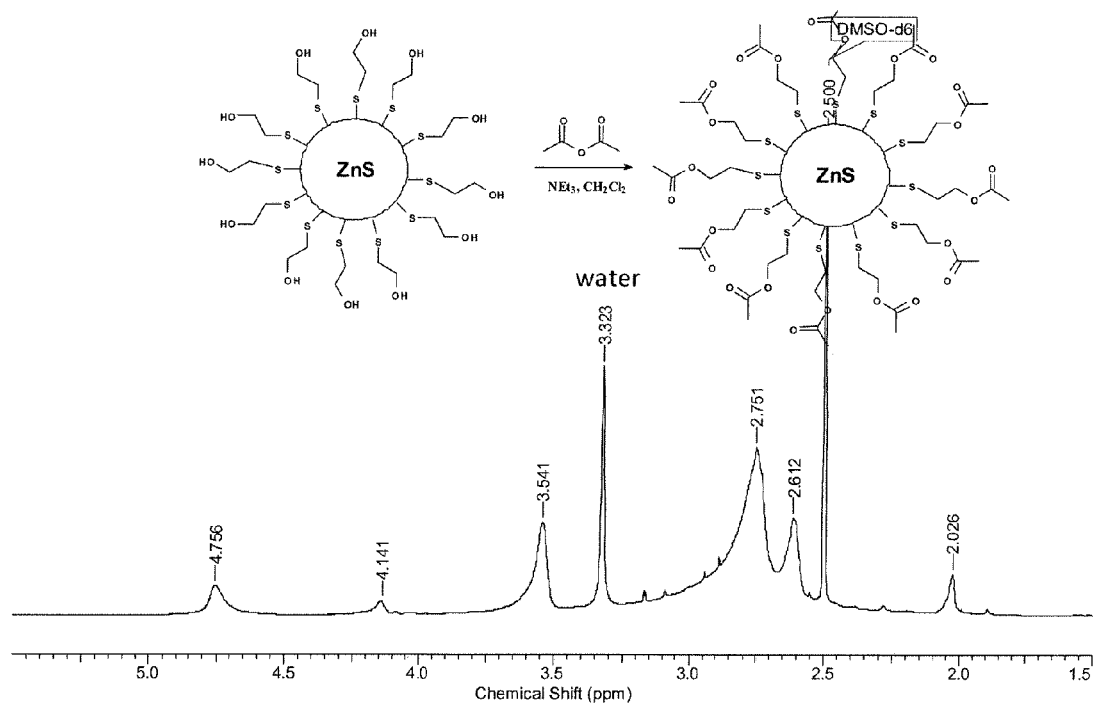
FIG. 5 is a $^1$H NMR spectrum of a particular embodiment of the disclosed nanoparticle comprising multiple mercaptoethanol surface ligands.

Without being limited to a single theory of operation, it is currently believed that restricting the movements of the oleic acid molecules as well, as shielding, causes particular peaks to collapse into a major peak, whereas peaks that are further away from the functional group that couples the ligand to the nanoparticle since they retain more rotational freedom. A similar effect is observed after ligand exchange of the nanoparticles with the surface exchange ligand. In particular disclosed embodiments, the nanoparticle is a PbS nanoparticle and the surface exchange ligand is 6-acetoxyhexanoic acid. FIGS. 4A and 4B illustrate such an embodiment. FIG. 4A is a representative $^1$H NMR spectrum of free 6-acetoxyhexanoic acid in CDCl$_3$ and FIG. 4B illustrates the spectrum obtained from 6-acetoxyhexanoic acid-stabilized PbS nanoparticles. While the peaks retain their original relative position and integration values, the peaks broaden and change slightly in their chemical shift, thereby indicating that the surface exchange ligands (e.g., acetoxyhexanoic acid ligands) are bound to the nanoparticles. FIG. 5 is a $^1$H NMR spectrum of another disclosed embodiment, a ZnS nanoparticle functionalized with mercaptoethanol ligands.

Figure 6:
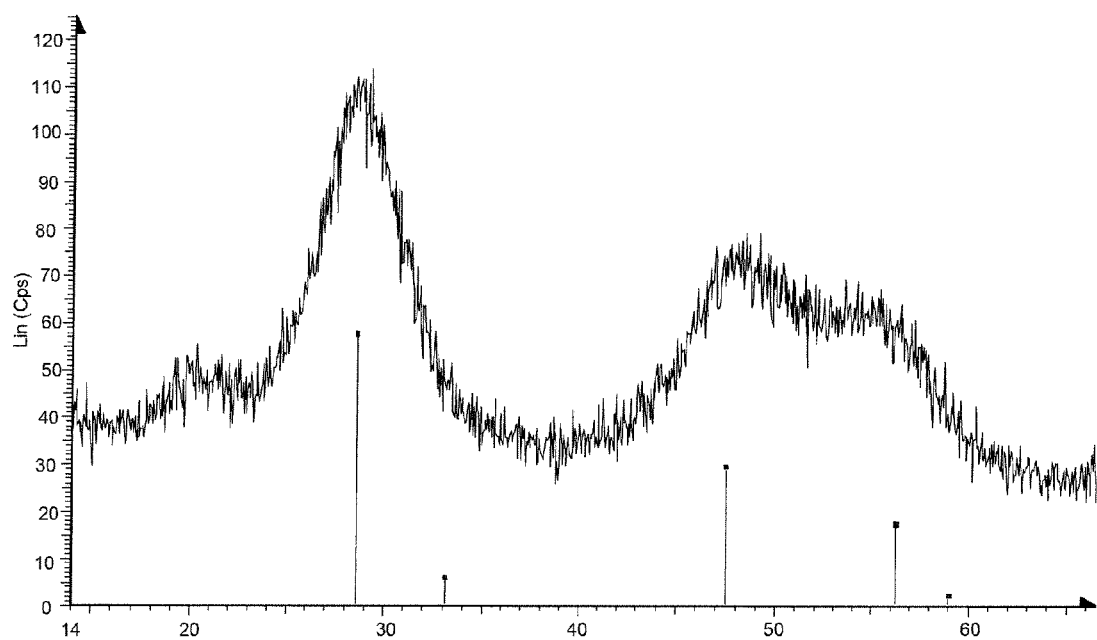
FIG. 6 is a wide angle x-ray diffraction (WAXD) spectrum obtained from one embodiment of the disclosed nanoparticle.
Figure 7:
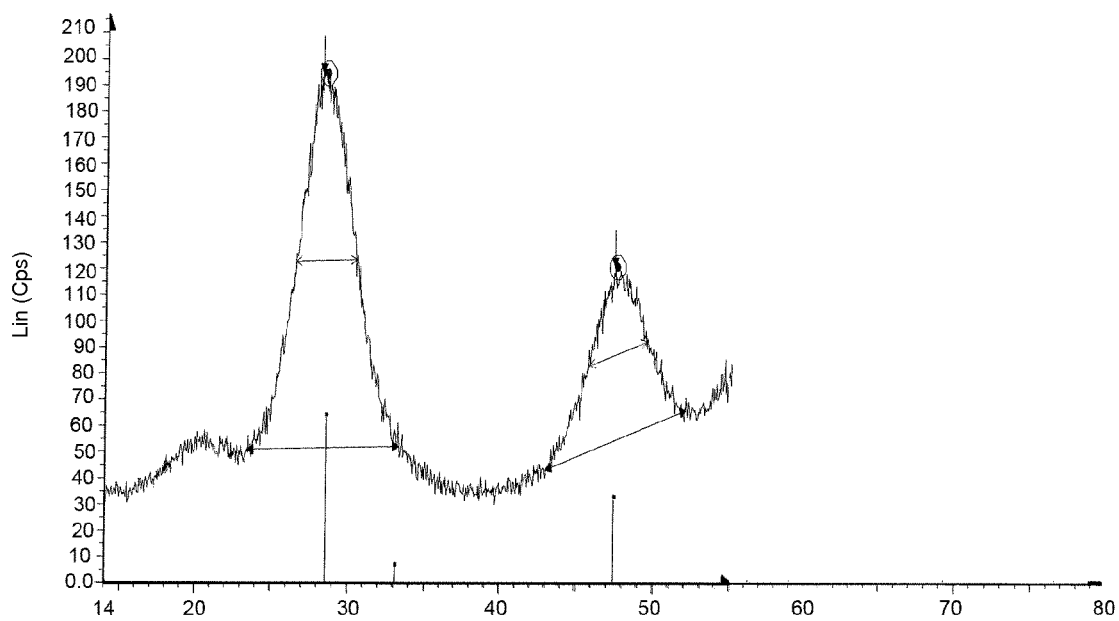
FIG. 7 is a wide angle x-ray diffraction (WAXD) spectrum obtained from one embodiment of the disclosed nanoparticle.
Figure 8:
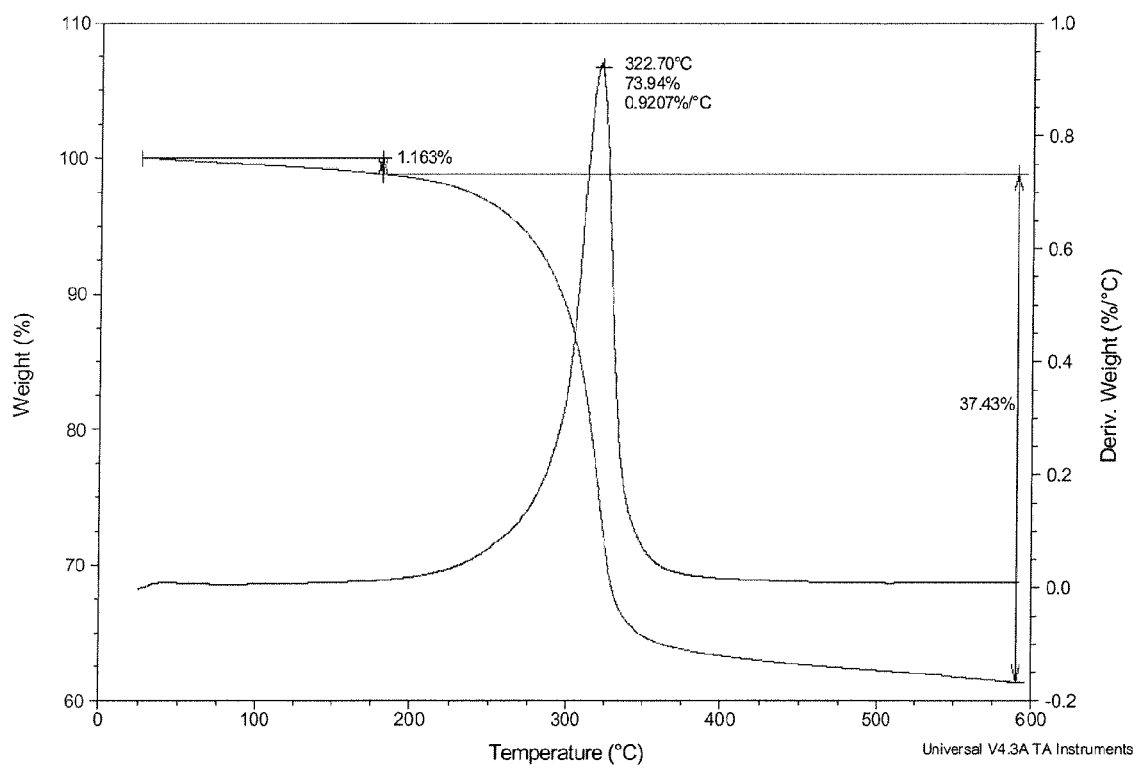
FIG. 8 is a thermogravimetric analysis plot of a mercaptoethanol-stabilized ZnS nanoparticle.
Figure 9:
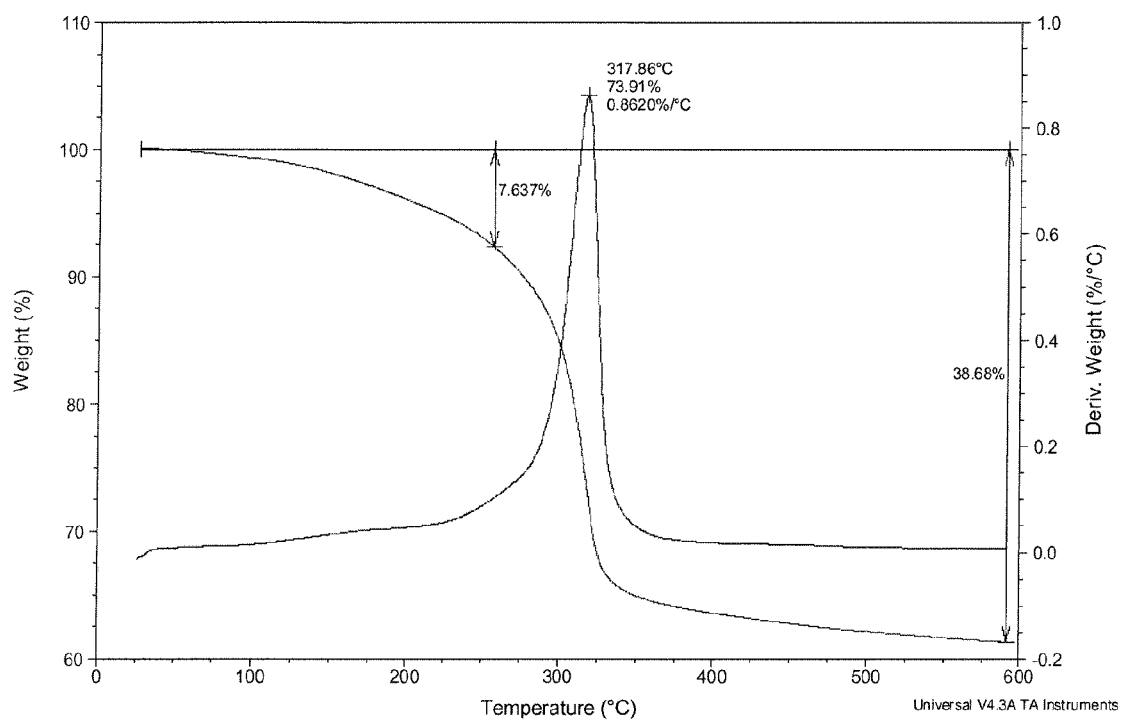
FIG. 9 is a thermogravimetric analysis plot of the mercaptoethanol-stabilized ZnS nanoparticle of FIG. 8 after it has been modified with an acetoxy group to provide an acetoxyethanethiol-stabilized ZnS nanoparticle.
Figure 10:
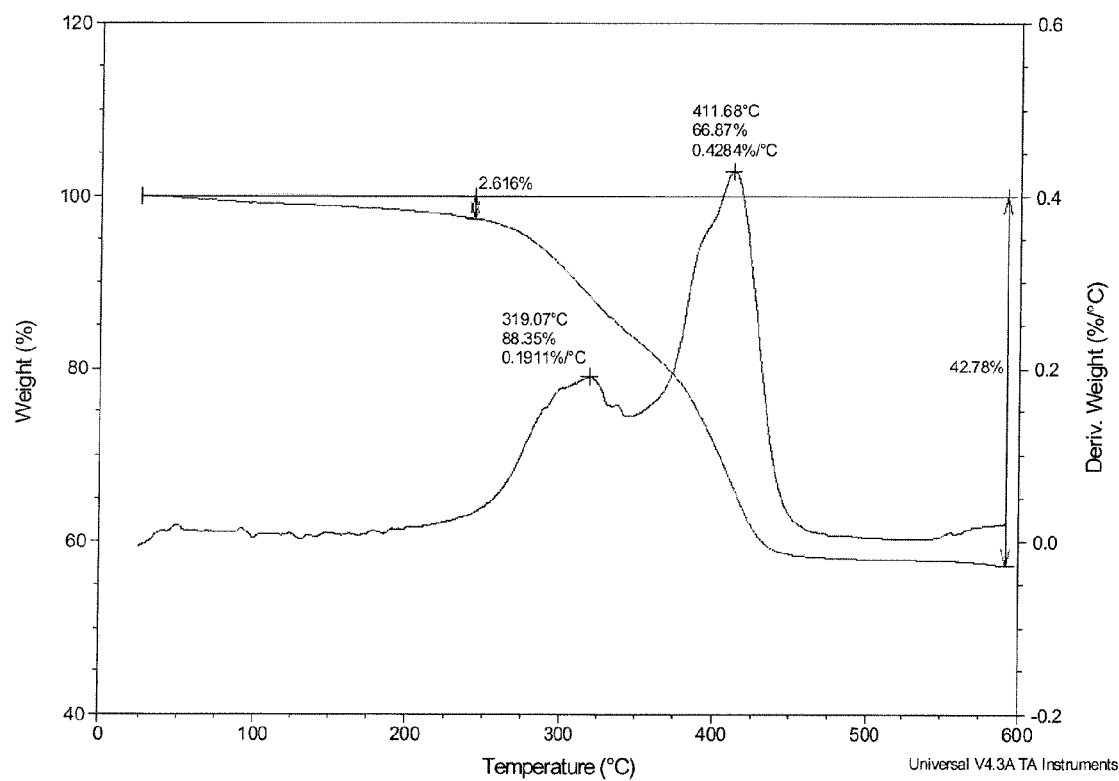
FIG. 10 is a thermogravimetric analysis plot obtained from a 6-mercapto-1-hexanol-stabilized ZnS nanoparticle.

Other methods may be used to determine nanoparticle formation. For example, wide angle x-ray diffraction (WAXD) may be used to identify the nanoparticles after they have undergone ligand exchange. Examples of results obtained using this method are illustrated in FIGS. 6 and 7. FIG. 6 illustrates an X-ray spectrum obtained from a ZnS nanoparticle comprising mercaptoethanol ligands. With reference to FIG. 6, the near merging peaks at 47.8 and 56.3 degrees indicate that the particles, or the crystal domains, are very small. FIG. 7 illustrates a spectrum obtained from a ZnS nanoparticle functionalized with 6-mercapto-1-hexanol ligands. Additional embodiments concern using thermogravimetric analysis to determine the amount of ligand bound to nanoparticles. For example, FIG. 8 is a thermogravimetric analysis plot of a mercaptoethanol-stabilized ZnS nanoparticle, and FIG. 9 is a thermogravimetric analysis plot of the mercaptoethanol-stabilized ZnS nanoparticle after it has been modified with an acetoxy group to provide an acetoxyethanethiol-stabilized ZnS nanoparticle. FIG. 10 further illustrates another embodiment wherein thermogravimetric analysis is used; particularly to identify the amount of ligand bound to a 6-mercapto-1-hexanol-stabilized ZnS nanoparticle.

V. Working Embodiments

Synthesis of potassium 6-hydroxyhexanoate—Potassium hydroxide (74.53 g, 1.328 mol) was dissolved in 800 mL methanol. ϵ-Caprolactone (150 mL, 154.5 g, 1.354 mol) was slowly poured into the solution over 2 minutes and allowed to stir for 1 hour at room temperature. Rotary evaporation yielded crude potassium 6-hydroxyhexanoate as an off-white solid. Residual s-caprolactone and other impurities were removed by stirring the insoluble potassium salt in ethyl ether for 1 hour followed by filtration of the resulting white solid. Final yield of potassium 6-hydroxyhexanoate was 219 g (95% yield).

Synthesis of 6-acetoxyhexanoic acid—Potassium 6-hydroxyhexanoate (100 g, 0.558 mol) was dissolved in glacial acetic acid (800 mL, 839.2 g, 12.9 mol). A Dean-Stark trap was attached to the flask and 100 mL toluene was added to the reaction solution for removal of water by azeotropic distillation. The reaction solution was heated to 130° C. (oil bath temperature) until water was no longer generated. Rotary evaporation was used to remove the toluene and acetic acid. The resulting viscous liquid was partitioned between 10% aqueous HCl and ethyl ether. The aqueous phase was extracted with ethyl ether (3×300 mL) and the combined organic phase was rotary evaporated to yield a yellow viscous liquid. Vacuum distillation at 130° C. (~200 microns) yielded a colorless oily liquid, which was determined to be pure 6-acetoxyhexanoic acid by $^1$H and $^{13}$CNMR (87.98 g; 88% yield).

Preparation of PbS-AHA coated nanoparticles—lead sulfide nanoparticles with oleic acid ligand surface treatment (PbS-OA) (143 mg PbS-OA; 100 mg PbS without ligand) where dissolved in 10 mL methylene chloride followed by addition of 6-acetoxyhexanoic acid (AHA) (0.75 g, 0.00419 mol; 10× mol PbS). The resulting solution was placed in an ultrasonic bath for 1 hour. PbS-AHA nanoparticles were precipitated by addition of the reaction solution into a 5-fold excess of hexane. The solid was collected by centrifugation to yield a clear, colorless solution and a small quantity of a dark brown oily liquid containing the PbS-AHA and excess ligand. After decanting the clear solution, the resulting PbS-AHA/ligand mixture was dissolved in 5 mL methylene chloride and precipitated a second time in a 5-fold excess of hexane. Centrifugation yielded a dark brown solid, which was dried under vacuum at room temperature. Solid PbS-AHA was dissolved in 10 mL methylene chloride and 1,6-hexanedioldiacrylate (HDODA) was added. The solution was sonicated for 1 hour before removal of methylene chloride by rotary evaporation. The resulting stable, dark transparent brown solution of PbS-AHA in HDODA (1-50% wt/wt) was used for further experimentation.

Preparation of ZnS ME nanoparticles: Zinc acetate dihydrate (5.46167 g, 0.02488 mol) was placed in a 100 mL 3-neck round bottom flask fitted with a reflux condenser, a septum and a stopper and dissolved in 40 mL DMF. The solution was allowed to purge under a stream of nitrogen for 15 minutes during which time mercaptoethanol (2.6 mL; 2.8964 g, 0.03707 mol) was added by syringe. The solution was purged with nitrogen for 30 minutes followed by addition of thiourea (1.59562 g, 0.02096 mmol) in 10 mL DMF. The solution was heated to 150° C. for 20 hours. The resulting pale yellow, completely transparent solution was allowed to cool to room temperature and the volume was reduced to 20 mL by vacuum distillation. The remaining solution was added slowly to rapidly stirred flask containing 400 mL of ethanol to yield a white precipitate which was collected by centrifugation. Addition of 5 mL DMF yielded a completely clear (no haze or precipitate) syrupy solution, which was precipitated a second time. Centrifugation yielded a white solid which was determined to be ZnS by wide angle x-ray diffraction (WAXD) (Data collected and presented by Dr. Charles Dupuy of Voxtel, Inc). Based on TGA data (FIG. 8) ZnS-ME nanoparticles are ~37% mercaptoethanol by weight.

Acetoxy-functionalization of mercaptoethanol-stabilized zinc sulfide (ZnS-ME) nanoparticles: (0.4665 g; 0.1726 g, 2.2378 mmol mercaptoethanol) were dispersed in 10 mL CH$_2$Cl$_2$ followed by addition of acetic anhydride (0.5 mL; 0.4621 g, 4.5264 mmol). Triethylamine (0.65 mL; 0.4719 g, 4.6635 mmol) was added to the stirred suspension. After 1 hour, the solution became completely transparent. The mixture was stirred for 15 hours at room temperature and poured into 100 mL hexanes to yield a white precipitate which was collected by centrifugation.

Preparation of ZnS-6MCH nanoparticles: Zinc acetate dihydrate (5.4293 g, 0.0247 mol) was placed in a 100 mL 3-neck round bottom flask fitted with a reflux condenser, a septum and a stopper and dissolved in 40 mL DMF. The solution was allowed to purge under a stream of nitrogen for 15 minutes during which time 6-mercapto-1-hexanol (5 mL; 4.905 g, 0.0365 mol) was added by syringe. The solution was heated to 150° C. followed by addition of thiourea (1.59562 g, 0.02096 mmol) in 10 mL DMF. The reaction was allowed to stir at 150° C. for 20 hours. The resulting completely transparent solution was allowed to cool to room temperature and the volume was reduced to 5 mL by vacuum distillation. The remaining solution was added slowly to rapidly stirred flask containing 250 mL of acetone to yield a white precipitate, which was collected by centrifugation. Addition of 5 mL methanol yielded a completely clear (no haze or precipitate) syrupy solution, which was precipitated a second time into acetone. Centrifugation yielded a white solid, which was determined to be ZnS by wide angle x-ray diffraction (WAXD).

In view of the many possible embodiments to which the principles of the disclosure may be applied, it should be recognized that the illustrated embodiments are only preferred examples of the disclosure and should not be taken as limiting the scope of the disclosure.

We claim:

1. A composition, comprising:
   a polymerizable component; and
   a nanoparticle comprising a PbS or ZnS core, and one or more 6-acetoxyhexanoic acid ligands, acetoxy-functionalized mercaptoethanol ligands, or acetoxy-functionalized 6-mercapto-1-hexanol ligands coupled to the PbS or ZnS core.

2. The composition according to claim 1 wherein the polymerizable component has a refractive index ranging from about 1.2 to about 1.8.

3. The composition according to claim 1 wherein the polymerizable component has a viscosity of about 5 cP to about 20 cP.

4. The composition according to claim 1 wherein the polymerizable component has a viscosity of about 10 cP to about 15 cP.

5. The composition according to claim 1 wherein the polymerizable component is selected from hexanediol-diacrylate (HDDA), methyl acrylate, ethyl acrylate, butyl acrylate, isobutyl acrylate, tert-butyl acrylate, n-hexyl acrylate, ethylhexyl acrylate, n-octyl acrylate, isooctyl acrylate, n-decyl acrylate, n-dodecyl acrylate, n-hexadecyl acrylate, n-octadecyl acrylate, isobornyl acrylate, benzyl acrylate, phenyl acrylate, low molecular weight oligio-ethylene glycol monomethyl ether acrylate, ethylene glycol monomethyl ether acrylate, diethyleneglycol monomethyl ether acrylate, triethylene glycol monomethyl ether acrylate, tetraethylene glycol monomethyl ether acrylate, diethylene glycol diacrylate, triethylene glycol diacrylate, tetraethylene glycol diacrylate, low molecular weight oligio-ethylene glycol diacrylate, trimethylolpropane triacrylate, pentaerythritol tetraacrylate, neopentyl glycol diacrylate (2,2-dimethyl-1,3-propanediol diacrylate), 1,10-decanediol diacrylate, hexanediol-dimethacrylate, ethyl methacrylate, butyl methacrylate, isobutyl methacrylate, tert-butyl methacrylate, n-hexyl methacrylate, ethylhexyl methacrylate, n-octyl metacrylate, isooctyl methacrylate, n-decyl methacrylate, n-dodecyl methacrylate, n-hexadecyl methacrylate, n-octadecyl methacrylate, benzyl methacrylate, phenyl methacrylate, low molecular weight oligio-ethylene glycol monomethyl ether methacrylate, ethylene glycol monomethyl ether methacrylate, diethyleneglycol monomethyl ether methacrylate, triethylene glycol monomethyl ether methacrylate, tetraethylene glycol monomethyl ether methacrylate, diethylene glycol dimethacrylate, triethylene glycol dimethacrylate, tetraethylene glycol dimethacrylate, low molecular weight oligio-ethylene glycol dimethacrylate, trimethylolpropane trimethacrylate, pentaerythritol tetramethacrylate, neopentyl glycol dimethacrylate (2,2-dimethyl-1,3-propanediol dimethacrylate), 1,10-decanediol dimethacrylate, hexanediol-dimethacrylate, ethyl methacrylate, butyl methacrylate, isobutyl methacrylate, tert-butyl methacrylate, n-hexyl methacrylate, ethylhexyl methacrylate, n-octyl metacrylate, isooctyl methacrylate, n-decyl methacrylate, n-dodecyl methacrylate, n-hexadecyl methacrylate, n-octadecyl methacrylate, benzyl methacrylate, phenyl methacrylate, low molecular weight oligio-ethylene glycol monomethyl ether methacrylate, ethylene glycol monomethyl ether methacrylate, diethyleneglycol monomethyl ether methacrylate, triethylene glycol monomethyl ether methacrylate, tetraethylene glycol monomethyl ether methacrylate, diethylene glycol dimethacrylate, triethylene glycol dimethacrylate, tetraethylene glycol dimethacrylate, low molecular weight oligio-ethylene glycol dimethacrylate, trimethylolpropane trimethacrylate, pentaerythritol tetramethacrylate, neopentyl glycol dimethacrylate (2,2-dimethyl-1,3-propanediol dimethacrylate), 1,10-decanediol dimethacrylate, and combinations thereof.

6. The composition according to 1 wherein the nanoparticle is present in an amount ranging from about 1% wt/v to about 80% wt/v.

7. The composition according to claim 1 wherein the nanoparticle has a diameter ranging from about 2 nm to about 50 nm.

8. The composition according to claim 1 wherein the nanoparticle is spherical, ellipsoidal, or oblate.

9. A nanoparticle, comprising a PbS or ZnS core, and one or more 6-acetoxyhexanoic acid ligands, acetoxy-functionalized mercaptoethanol ligands, or acetoxy-functionalized 6-mercapto-1-hexanol ligands coupled to the PbS or ZnS core.

10. A method of making a functionalized nanoparticle comprising one or more 6-acetoxyhexanoic acid ligands, acetoxy-functionalized mercaptoethanol ligands, or acetoxy-functionalized 6-mercapto-1-hexanol ligands, comprising:
    modifying a nanoparticle comprising a PbS or ZnS core with one or more surface ligands;
    functionalizing the nanoparticle to form the functionalized nanoparticle; and
    isolating the functionalized nanoparticle comprising one or more 6-acetoxyhexanoic acid ligands, acetoxy-functionalized mercaptoethanol ligands, or acetoxy-functionalized 6-mercapto-1-hexanol ligands.

11. The method according to claim 10 wherein modifying comprises exposing a ligand-free nanoparticle comprising the PbS or ZnS core to the one or more surface ligands.

12. The method according to claim 10 wherein functionalizing the nanoparticle comprises performing a ligand exchange reaction, a functional group modification reaction, or combinations thereof.

13. The method according to claim 12 wherein performing the ligand exchange reaction comprises exposing a nanoparticle comprising the PbS or ZnS core and the one or more surface ligands to one or more 6-acetoxyhexanoic acid surface exchange ligands.

14. The method according to claim 13 wherein the 6-acetoxyhexanoic acid surface exchange ligand replaces the one or more surface ligands.

15. The method according to claim 12 wherein performing the functional group modification reaction comprises exposing a nanoparticle comprising the PbS or ZnS core and the one or more surface ligands to acetic anhydride.

\* \* \* \* \*